US012746776B2

(12) United States Patent
Ikai et al.

(10) Patent No.: US 12,746,776 B2
(45) Date of Patent: Sep. 29, 2026

(54) WRITING IMPLEMENT

(71) Applicants: KABUSHIKI KAISHA PILOT CORPORATION, Tokyo (JP); THE PILOT INK CO., LTD., Nagoya (JP)

(72) Inventors: Tomoya Ikai, Tokyo (JP); Misako Mabuchi, Nagoya (JP)

(73) Assignees: KABUSHIKI KAISHA PILOT CORPORATION, Tokyo (JP); THE PILOT INK CO., LTD., Nagoya (JP)

( * ) Notice: Subject to any disclaimer, the term of this patent is extended or adjusted under 35 U.S.C. 154(b) by 0 days.

(21) Appl. No.: 18/716,302

(22) PCT Filed: Dec. 5, 2022

(86) PCT No.: PCT/JP2022/044669
§ 371 (c)(1),
(2) Date: Jun. 4, 2024

(87) PCT Pub. No.: WO2023/106251
PCT Pub. Date: Jun. 15, 2023

(65) Prior Publication Data

US 2025/0033402 A1 Jan. 30, 2025

(30) Foreign Application Priority Data

Dec. 8, 2021 (JP) ................................ 2021-198947

(51) Int. Cl.
*B43K 7/08* (2006.01)
*B43K 7/02* (2006.01)
(Continued)

(52) U.S. Cl.
CPC .................. *B43K 7/08* (2013.01); *B43K 7/02* (2013.01); *B43K 7/10* (2013.01)

(58) Field of Classification Search
CPC .......... B43K 5/02; B43K 5/1809; B43K 7/08; B43K 8/06; B43K 8/08
See application file for complete search history.

(56) References Cited

U.S. PATENT DOCUMENTS 5,087,144 A * 2/1992 Wada ....................... B43K 5/02 401/229
5,427,463 A * 6/1995 Bastiansen ............... B43K 8/18 401/258
(Continued)

FOREIGN PATENT DOCUMENTS

CN 1326406 A 12/2001
CN 1429153 A 7/2003
(Continued)

OTHER PUBLICATIONS

International Search Report for International Application No. PCT/JP2022/044669; Mailing Date, Jan. 17, 2023.
(Continued)

*Primary Examiner* — David P Angwin
*Assistant Examiner* — Bradley S Oliver
(74) *Attorney, Agent, or Firm* — CANTOR COLBURN LLP

(57) ABSTRACT

An ink retention member includes an ink retention portion including ink retention grooves and ink guiding grooves. The ink retention member includes a first horizontal hole penetrating radially therethrough and being in communication with an inner hole. The first horizontal hole and the ink guiding grooves are formed not to communicate with each other in a transverse cross-section. The first horizontal hole is provided in a rear half portion of the ink retention portion. The ink retention member includes a second horizontal hole that is disposed forward from the first horizontal hole, radially penetrates therethrough, and communicates with the inner hole. The first horizontal hole and the second horizon-
(Continued)

tal hole are each provided to penetrate at least one comb tooth axially and communicate with the ink retention grooves adjacent to the comb tooth.

6 Claims, 18 Drawing Sheets

(51) Int. Cl.

| | |
|---|---|
| ***B43K 7/10*** | (2006.01) |
| ***B43K 8/06*** | (2006.01) |

(56) References Cited

U.S. PATENT DOCUMENTS

| | | | | |
|---|---|---|---|---|
| 5,775,828 | A | 7/1998 | Ikeda | |
| 5,906,446 | A | 5/1999 | Mcculloch et al. | |
| 5,951,187 | A | 9/1999 | Hsieh | |
| 6,588,963 | B2 | 7/2003 | Furukawa et al. | |
| 6,602,012 | B2 | 8/2003 | Furukawa et al. | |
| 6,769,827 | B2 * | 8/2004 | Furukawa | B43K 5/18 401/223 |
| 9,119,457 | B2 * | 9/2015 | Ooba | A45D 34/04 |
| 9,969,205 | B2 * | 5/2018 | Kawasaki | B43K 8/08 |
| 11,707,127 | B2 * | 7/2023 | Hattori | B43K 8/06 401/126 |
| 2003/0180084 | A1 | 9/2003 | Firukawa et al. | |
| 2014/0348568 | A1 | 11/2014 | Ooba | |
| 2018/0319200 | A1 | 11/2018 | Fukumoto et al. | |

FOREIGN PATENT DOCUMENTS

| | | | |
|---|---|---|---|
| CN | 105848918 | A | 8/2016 |
| DE | 3442331 | A1 | 5/1986 |
| EP | 0469465 | A1 | 2/1992 |
| JP | S59190584 | U | 12/1984 |
| JP | S63108784 | U | 7/1988 |
| JP | H0273371 | U | 6/1990 |
| JP | H0357512 | Y2 | 12/1991 |
| JP | H0852976 | A | 2/1996 |
| JP | 3056959 | U | 3/1999 |
| JP | 2000062381 | A | 2/2000 |
| JP | 4212714 | B2 | 1/2009 |
| JP | 4666872 | B2 | 4/2011 |
| JP | 2021030463 | A | 3/2021 |
| TW | 296357 | B | 1/1997 |
| WO | 0187642 | A1 | 11/2001 |

OTHER PUBLICATIONS

EPO Extended European Search Report for EP Application No. 22904180.1; issued Nov. 3, 2025.

TIPO Office Action for corresponding TW Application No. 111146548; issued Dec. 10, 2025.

CNIPA First Office Action for corresponding CN Application No. 202280081318.X; Issued Feb. 25, 2026.

EPO Extended European Search Report including the supplementary European Search and the European search opinion for corresponding EP application No. 229041080.1; issued Feb. 19, 2026.

* cited by examiner

WRITING IMPLEMENT

CROSS REFERENCE TO RELATED APPLICATIONS

This is the U.S. national stage of application No. PCT/JP2022/044669, filed on Dec. 5, 2022. Priority under 35 U.S.C. § 119(a) and 35 U.S.C. § 365(b) is claimed from Japanese Application No. 2021-198947, filed Dec. 8, 2021, the disclosure of which is also incorporated herein by reference.

TECHNICAL FIELD

The present invention relates to a writing implement. Specifically, the present invention relates to a direct liquid type writing implement including a pen tip, an ink tank that directly retains ink, an ink retention member that includes the pen tip at a front-end portion thereof, is provided on a front side of the ink tank, and temporarily retains overflow ink accompanying an increase in pressure inside the ink tank, and an ink guiding member that is provided inside the ink retention member and supplies the ink from the ink tank to the pen tip.

BACKGROUND ART

In the related art, Patent Document 1 discloses a configuration in which a vent hole communicating with a through hole is provided in a side surface portion of an ink retainer in which the through hole for attaching an ink guiding core is formed. Patent Document 2 discloses a configuration in which a through hole is provided from an outer surface of a collector toward an inner hole of the collector.

CITATION LIST

Patent Literature

[Patent Document 1]
Japanese Patent No. 4212714
[Patent Document 2]
Japanese Patent No. 4666872

SUMMARY OF INVENTION

Technical Problem

In the above Patent Document 1, when ink in an ink chamber freezes (especially when the ink freezes with a pen tip facing downward), the volumetrically expanded ink in the ink chamber is pushed out through the through hole near the pen tip, and the pushed out ink cannot be reliably discharged from the vent hole to an outer surface of the ink retainer, which may cause the ink to leak from the pen tip.

Similarly to the above, in Patent Document 2, when ink in an ink tank freezes (especially when the ink freezes with a pen tip facing downward), the volumetrically expanded ink in the ink tank is pushed out through the inner hole near the pen tip, and the pushed out ink cannot be reliably discharged from the through hole to the outer surface of the collector, which may cause the ink to leak from the pen tip.

The present invention has been made to solve the problems in the related art and aims to provide a direct liquid type writing implement that can reliably prevent ink from leaking from a pen tip even if the ink inside freezes. In the present invention, "forward" indicates the pen tip side, and "rearward" indicates a side opposite thereto. Definitions of directions in the present invention will be described separately later.

Solution to Problem

The present invention provides the following means to solve the above problems.

Aspect 1 of the Present Invention

A writing implement including a pen tip, an ink tank that directly retains ink, an ink retention member that includes the pen tip at a front-end portion thereof, is provided on a front side of the ink tank, and temporarily retains overflow ink accompanying an increase in pressure inside the ink tank, and an ink guiding member that is provided inside the ink retention member and supplies the ink from the ink tank to the pen tip, wherein the ink retention member includes a plurality of plate-shaped comb teeth formed at intervals on an outer surface thereof, a plurality of ink retention grooves that are formed between the comb teeth and temporarily retain the ink, an axially extending slit-shaped ink guiding groove that communicates with the ink tank and communicates with each of the ink retention grooves, an ink retention portion that is formed on an outer surface thereof in a front to rear direction and includes the ink retention grooves and the ink guiding groove, and an inner hole that is provided to extend in an axial direction and has the ink guiding member provided therein, the ink retention member includes a first horizontal hole that opens radially outward and communicates with the inner hole, the first horizontal hole and the ink guiding groove are formed not to communicate with each other in a transverse cross-section, and the first horizontal hole is provided in a rear half portion of the ink retention portion.

According to the writing implement of the above aspect, even if the ink in the ink tank freezes with the pen tip facing downward, the ink pushed out from the ink tank can be quickly and reliably discharged to the outside from the first horizontal hole near the ink tank before it reaches the vicinity of the pen tip. As a result, it is possible to reliably prevent the ink from leaking from the pen tip when the ink in the ink tank freezes.

Aspect 2 of the Present Invention

The writing implement according to Aspect 1, wherein the ink retention member includes a second horizontal hole that is disposed forward from the first horizontal hole, opens radially outward, and communicates with the inner hole, and the second horizontal hole and the ink guiding groove are formed not to communicate with each other in the transverse cross-section.

According to the writing implement of the above aspect, when the ink freezes, an amount of the frozen ink corresponding to the volumetric expansion in the ink tank is mainly discharged to the outside through the first horizontal hole, and the amount of the frozen ink corresponding to the volumetric expansion inside the inner hole is discharged to the outside through the second horizontal hole. Thus, it is possible to more reliably prevent the ink from leaking from the pen tip when the ink freezes. In addition, according to the writing implement of the above aspect, when the ink in the ink tank is first drawn out to the pen tip (that is, at the time of initial ink discharging), the residual air inside the inner hole is reliably discharged to the outside through the second horizontal hole, and the ink can be quickly drawn from the ink tank to the pen tip.

Aspect 3 of the Present Invention

The writing implement according to aspect 1 or 2, wherein the first horizontal hole is provided to penetrate at least one comb tooth of the comb teeth in the axial direction and communicates with the ink retention grooves adjacent to the comb tooth.

According to the writing implement of the above aspect, a sufficient opening area of the first horizontal hole can be secured, and when the ink freezes, the overflow ink from the first horizontal hole can be reliably discharged to the outside. Further, according to the writing implement of the above aspect, when the ink freezes, the overflow ink from the first horizontal hole can be discharged into the ink retention grooves. Thus, when the pressure inside the ink tank is reduced after the ink thaws, the ink in the ink retention grooves is quickly collected into the ink tank through the ink guiding groove. As a result, ink remaining in the vicinity of the first horizontal hole can be avoided.

Aspect 4 of the Present Invention

The writing implement according to aspect 2, wherein the second horizontal hole is provided to penetrate at least one comb tooth of the comb teeth in the axial direction and communicates with the ink retention grooves adjacent to the comb tooth.

According to the writing implement of the above aspect, a sufficient opening area of the second horizontal hole can be secured, and when the ink freezes, the overflow ink from the second horizontal hole can be reliably discharged to the outside. Further, according to the writing implement of the above aspect, when the ink freezes, the overflow ink from the second horizontal hole can be discharged into the ink retention grooves. Thus, when the pressure inside the ink tank is reduced after the ink thaws, the ink in the ink retention grooves is quickly collected into the ink tank through the ink guiding groove. As a result, ink remaining in the vicinity of the second horizontal hole can be avoided. In particular, when the first horizontal hole and the second horizontal hole are provided to penetrate at least one comb tooth in the axial direction and communicate with the ink retention grooves adjacent to the comb tooth, the following effects can be obtained. That is, when the ink freezes, the overflow ink inside the inner hole can be reliably discharged to the outside, and after the ink thaws, ink remaining in the vicinity of the first horizontal hole can be avoided, and ink remaining in the vicinity of the second horizontal hole can be avoided.

Aspect 5 of the Present Invention

A writing implement according to any one of aspects 1 to 4, wherein the first horizontal hole includes a first inner opening portion that opens into the inner hole, a first outer opening portion that opens radially outward, and a first step portion that is disposed between the first inner opening portion and the first outer opening portion and faces radially outward.

According to the writing implement of the above aspect, the first step portion can prevent the ink discharged from the inner hole to the outside through the first horizontal hole from returning to the inside of the inner hole. According to the above-described aspect, it is possible to prevent problems such as the ink leaking from the pen tip due to the overflow ink unintentionally returning from the first horizontal hole to the inner hole.

More specifically, the overflow ink discharged from the inner hole to the outside through the first horizontal hole is prevented from flowing back into the inner hole due to the function of the first step portion. Then, the overflow ink stably flows from the first horizontal hole to the ink guiding groove through the ink retention grooves due to the capillary force. The overflow ink is efficiently collected from the ink guiding groove into the ink tank.

Aspect 6 of the Present Invention

A writing implement according to aspect 2 or 4, wherein the second horizontal hole includes a second inner opening portion that opens into the inner hole, a second outer opening portion that opens radially outward, and a second step portion that is disposed between the second inner opening portion and the second outer opening portion and faces radially outward.

According to the writing implement of the above aspect, the second step portion can prevent the ink discharged from the inner hole to the outside through the second horizontal hole from returning to the inside of the inner hole. According to the above-described aspect, it is possible to prevent problems such as ink leaking from the pen tip due to overflow ink unintentionally returning from the second horizontal hole to the inner hole.

More specifically, the overflow ink discharged from the inner hole to the outside through the second horizontal hole is prevented from flowing back into the inner hole due to the function of the second step portion. Then, the overflow ink stably flows from the second horizontal hole to the ink guiding groove through the ink retention grooves due to the capillary force. The overflow ink is efficiently collected from the ink guiding groove into the ink tank.

Aspect 7 of the Present Invention

A writing implement including a pen tip, an ink tank that directly retains ink, an ink retention member that includes the pen tip at a front-end portion thereof, is provided on a front side of the ink tank, and temporarily retains overflow ink accompanying an increase in pressure inside the ink tank, and an ink guiding member that is provided inside the ink retention member and supplies the ink from the ink tank to the pen tip, wherein the ink retention member includes a plurality of plate-shaped comb teeth formed at intervals on an outer surface thereof, a plurality of ink retention grooves that are formed between the comb teeth and temporarily retain the ink, an axially extending slit-shaped ink guiding groove that communicates with the ink tank and communicates with each of the ink retention grooves, and an inner hole that is provided to extend in an axial direction and has the ink guiding member provided therein, the ink retention member includes a horizontal hole that opens radially outward and communicates with the inner hole, the horizontal hole and the ink guiding groove are formed not to communicate with each other in a transverse cross-section, and the horizontal hole is provided to penetrate at least one comb tooth of the comb teeth in the axial direction and communicates with the ink retention grooves adjacent to the comb tooth.

According to the writing implement of the above aspect, a sufficient opening area of the horizontal hole can be secured, and when the ink freezes, the overflow ink from the horizontal hole can be reliably discharged to the outside. Further, according to the writing implement of the above aspect, when the ink freezes, the overflow ink from the horizontal hole can be discharged into the ink retention grooves. Thus, when the pressure inside the ink tank is reduced after the ink thaws, the ink in the ink retention grooves is quickly collected into the ink tank through the ink guiding groove. As a result, ink remaining in the vicinity of the horizontal hole can be avoided. In addition, in the above aspect, the horizontal hole may be a single hole or may be a plurality of holes in a front to rear direction. Further, in the above aspect, the position at which the horizontal hole is formed may be any of a front half portion of the ink retention portion, a central portion of the ink retention portion, or a rear half portion of the ink retention portion.

Aspect 8 of the Present Invention

The writing implement according to aspect 7, wherein the horizontal hole includes an inner opening portion that opens into the inner hole, an outer opening portion that opens radially outward, and a step portion that is disposed between the inner opening portion and the outer opening portion and faces radially outward.

Aspect 9 of the Present Invention

A writing implement including a pen tip, an ink tank that directly retains ink, an ink retention member that includes the pen tip at a front-end portion thereof, is provided on a front side of the ink tank, and temporarily retains overflow ink accompanying an increase in pressure inside the ink tank, and an ink guiding member that is provided inside the ink retention member and supplies the ink from the ink tank to the pen tip, wherein the ink retention member includes a plurality of plate-shaped comb teeth formed at intervals on an outer surface thereof, a plurality of ink retention grooves that are formed between the comb teeth and temporarily retain the ink, an axially extending slit-shaped ink guiding groove that communicates with the ink tank and communicates with each of the ink retention grooves, and an inner hole that is provided to extend in an axial direction and has the ink guiding member provided therein, the ink retention member includes a horizontal hole that opens radially outward and communicates with the inner hole, the horizontal hole and the ink guiding groove are formed not to communicate with each other in a transverse cross-section, and the horizontal hole includes an inner opening portion that opens into the inner hole, an outer opening portion that opens radially outward, and a step portion that is disposed between the inner opening portion and the outer opening portion and faces radially outward.

According to the writing implement of the above aspect, the step portion can prevent the ink discharged from the inner hole to the outside through the horizontal hole from returning to the inside of the inner hole. According to the above-described aspect, it is possible to prevent problems such as ink leaking from the pen tip due to the overflow ink unintentionally returning from the horizontal hole to the inner hole.

Here, in known writing implements, there is also room for improvement in terms of efficiently returning overflow ink to an ink tank (hereinafter referred to as another problem). In this regard, according to the writing implement of the above aspect, the overflow ink discharged to the outside from the horizontal hole can efficiently return to the ink tank. Accordingly, it is possible to solve the other problem as well.

Advantageous Effects of Invention

The writing implements according to the above aspects of the present invention can reliably prevent the ink from leaking from the pen tip even if the ink inside freezes.

DESCRIPTION OF EMBODIMENTS

Figure 1:
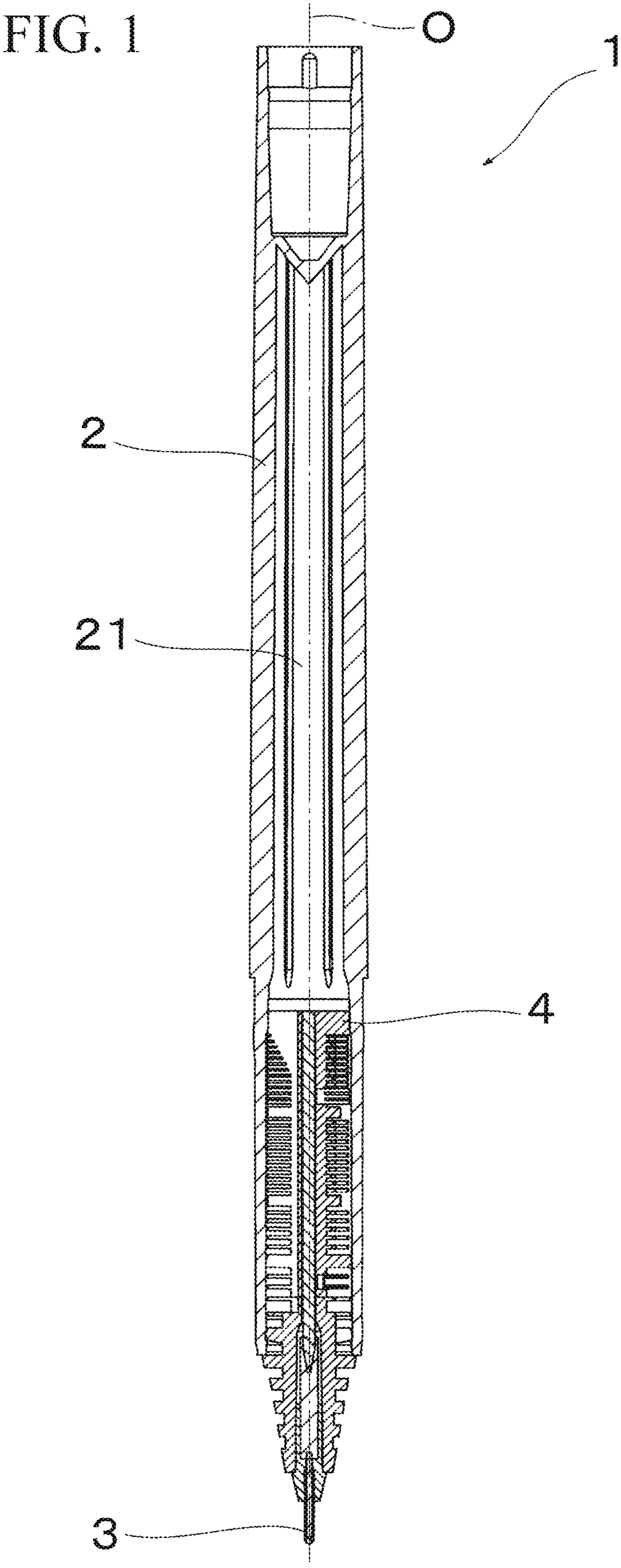
FIG. 1 is a longitudinal cross-sectional view showing an embodiment of a writing implement of the present invention.

A writing implement 1 according to an embodiment of the present invention is shown in FIG. 1 to FIG. 14. As shown in FIG. 1, the writing implement 1 of the present embodiment has a substantially tubular or substantially columnar shape centered on a central axis O. Specifically, the writing implement 1 has a substantially cylindrical or substantially cylinder shape. Also, in the present embodiment, illustration of the central axis O may be omitted in some figures.

Figure 2:
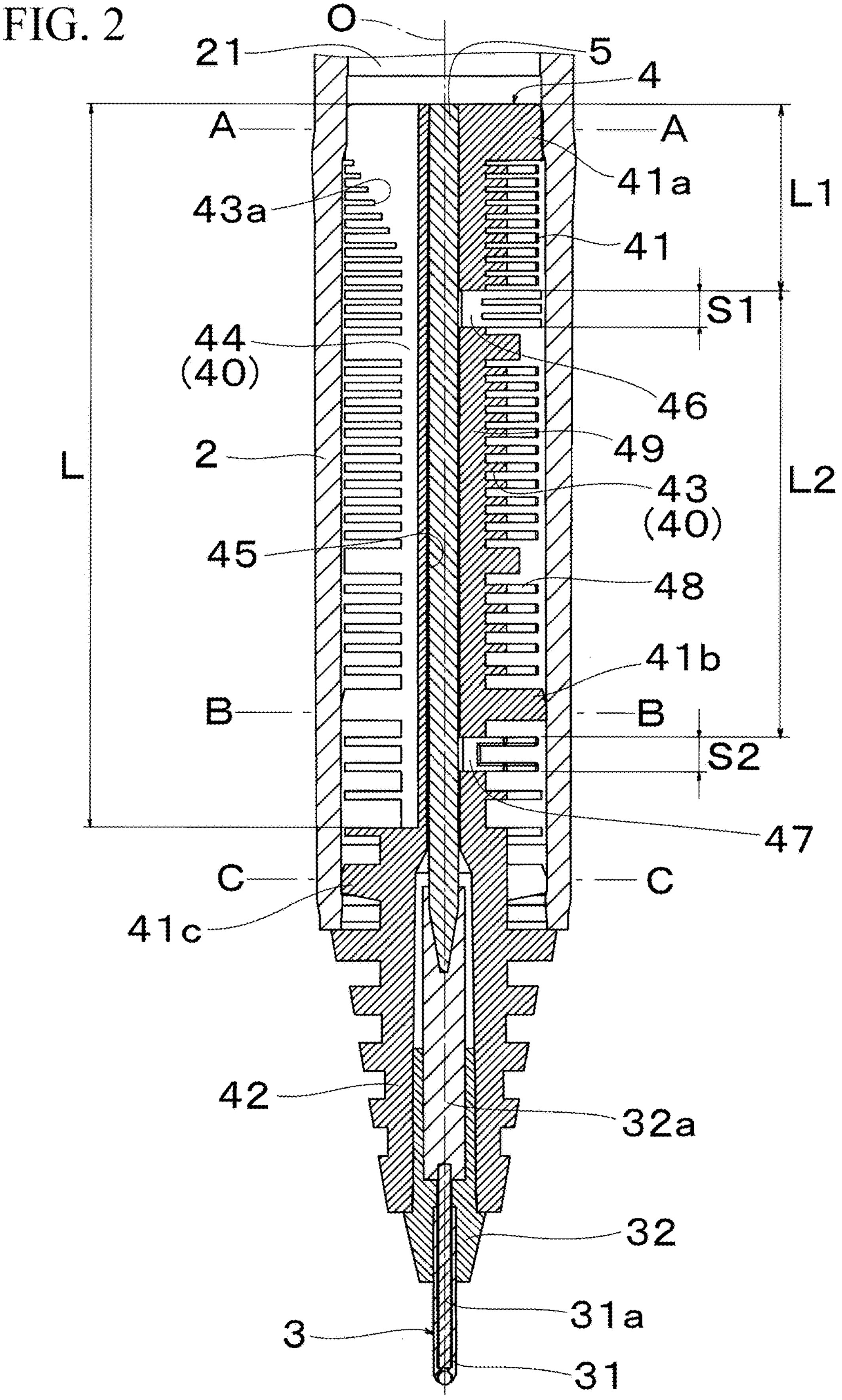
FIG. 2 is a longitudinal cross-sectional view showing an enlarged main part of FIG. 1.

As shown in FIG. 1 and FIG. 2, the writing implement 1 includes a pen tip 3, an ink retention member 4 having the pen tip 3 at a front-end portion thereof, a shaft cylinder 2 having the ink retention member 4 provided inside a front portion thereof, an ink tank 21 provided on a rear side of the ink retention member 4 in the shaft cylinder 2, and an ink guiding member 5 provided inside the ink retention member 4. The pen tip 3, the ink retention member 4, the shaft cylinder 2, the ink tank 21, and the ink guiding member 5 are disposed coaxially with each other with the central axis O as a common axis.

Definitions of directions used in the present embodiment will be explained. In the present embodiment, a direction in which the central axis O of the writing implement 1 extends, that is, a direction along the central axis O, will be referred to as a front to rear direction. Also, the front to rear direction may be referred to as an axial direction or a longitudinal direction. In the front to rear direction (the axial direction or the longitudinal direction), the ink tank 21 and the pen tip 3 are disposed at different positions with respect to each other. In the front to rear directions, a side in a direction from the ink tank 21 to the pen tip 3 will be referred to as a front side, and a side in a direction from the pen tip 3 to the ink tank 21 will be referred to as a rear side. Further, the front side may also be referred to as one side in the axial direction or one side in the longitudinal direction. The rear side may also be referred to as the other side in the axial direction or the other side in the longitudinal direction.

A direction perpendicular to the central axis O will be referred to as a radial direction. In the radial direction, a direction approaching the central axis O will be referred to as radially inward, and a direction separating from the central axis O will be referred to as radially outward. A direction rotating around the central axis O will be referred to as a circumferential direction.

Each constituent element of the writing implement 1 will be explained in detail.

Pen Tip

The pen tip 3 is disposed at a front-end portion of the writing implement 1. The pen tip 3 extends in the front to rear direction. Examples of the pen tip 3 include a ballpoint pen tip with a rotatable ball at its front end, a pen body made of a processed fiber body or a porous body, a metal plate pen body with a slit in its front end such as a fountain pen, a pen body made of an injection-molded synthetic resin body having a capillary gap in the axial direction, or the like. The pen tip 3 of the present embodiment includes a ballpoint pen tip 31 and a tip holder 32 that holds the ballpoint pen tip 31. A first relay core 31*a* is provided within the ballpoint pen tip 31, and a second relay core 32*a* is provided within the tip holder 32. A rear end of the first relay core 31*a* and a front end of the second relay core 32*a* are connected to each other, and a rear end of the second relay core 32*a* and a front end of the ink guiding member 5 are connected to each other. The first relay core 31*a* and the second relay core 32*a* are members including capillary gaps in the axial direction, and are made of, for example, an injection-molded synthetic resin body, a processed fiber body, or a porous body.

Shaft Cylinder

The shaft cylinder 2 is disposed in a portion of the writing implement 1 other than the front-end portion. The shaft cylinder 2 extends in the front to rear direction. The shaft cylinder 2 is configured of a bottomed cylindrical body with an open front end and a closed rear end and is obtained by injection molding of a synthetic resin (for example, polypropylene). The ink retention member 4 is disposed inside the front portion of the shaft cylinder 2. The ink tank 21 is formed inside the shaft cylinder 2 on the rear side of the ink retention member 4. Liquid ink is directly retained in the ink tank 21. The ink is, for example, a water-based ink and has a property of freezing when the temperature drops to a predetermined temperature.

Ink Retention Member

The ink retention member 4 is disposed between the pen tip 3 and the ink tank 21 in the front to rear direction. Specifically, the ink retention member 4 is provided on a rear side of the pen tip 3 and on a front side of the ink tank 21. The ink retention member 4 has a substantially tubular shape and extends in the front to rear direction. The ink retention member 4 is a member that can temporarily retain and hold ink that overflows from the ink tank 21. Also, in the present embodiment, the ink that overflows from the ink tank 21 may be referred to as overflow ink.

The ink retention member 4 includes a pen tip holding portion 42 disposed in a front-end portion of the ink retention member 4, a plurality of substantially disk-shaped comb teeth 41 disposed rearward from the pen tip holding portion 42, an inner hole 45 that is formed in an axial center portion of the ink retention member 4 and penetrates the ink retention member 4 in the axial direction, a cylindrical portion 49 to which the plurality of comb teeth 41 are connected, a plurality of ink retention grooves 43 that temporarily retain the ink, an ink guiding groove 44 that communicates with the ink tank 21, an ink retention portion 40, and horizontal holes 46 and 47. In the present embodiment, the ink retention member 4 has a plurality of horizontal holes 46 and 47. The plurality of horizontal holes 46 and 47 include a first horizontal hole 46 and a second horizontal hole 47 located away from the first horizontal hole 46 toward the front side.

The pen tip 3 is fixed to the pen tip holding portion 42. The pen tip holding portion 42 includes an attachment hole that communicates with the inner hole 45, and the pen tip 3 is press-fitted into the attachment hole. Specifically, the tip holder 32 holding the ballpoint pen tip 31 is press-fitted into the attachment hole. The ink guiding member 5 is inserted into the inner hole 45. That is, the ink guiding member 5 is provided inside the inner hole 45.

The ink retention member 4 is an injection-molded body of a synthetic resin (for example, ABS resin), and the comb teeth 41 and the pen tip holding portion 42 are integrally formed. The ink retention member 4 has a function of temporarily holding surplus ink (overflow ink) from the ink tank 21 when the pressure inside the ink tank 21 increases. In addition, the ink retention member 4 is a member that has a function of returning the temporarily held ink (overflow ink) to the ink tank 21 when the pressure inside the ink tank 21 decreases.

The cylindrical portion 49 has a cylindrical shape centered on the central axis O and extends in the front to rear direction. A front-end portion of the cylindrical portion 49 is connected to a rear end portion of the pen tip holding portion 42. The inner hole 45 penetrates the cylindrical portion 49 in the front to rear direction.

The plurality of comb teeth 41 each have a plate shape that extends in a direction perpendicular to the central axis O. A pair of plate surfaces of each of the comb teeth 41 face forward and rearward. The plurality of comb teeth 41 are formed on an outer surface of the ink retention member 4 at intervals in the front to rear direction. The comb teeth 41 have flange shapes that extend radially outward from an outer circumferential surface of the cylindrical portion 49. That is, radially inner end portions of the comb teeth 41 are connected to the outer circumferential surface of the cylindrical portion 49.

Figure 13:
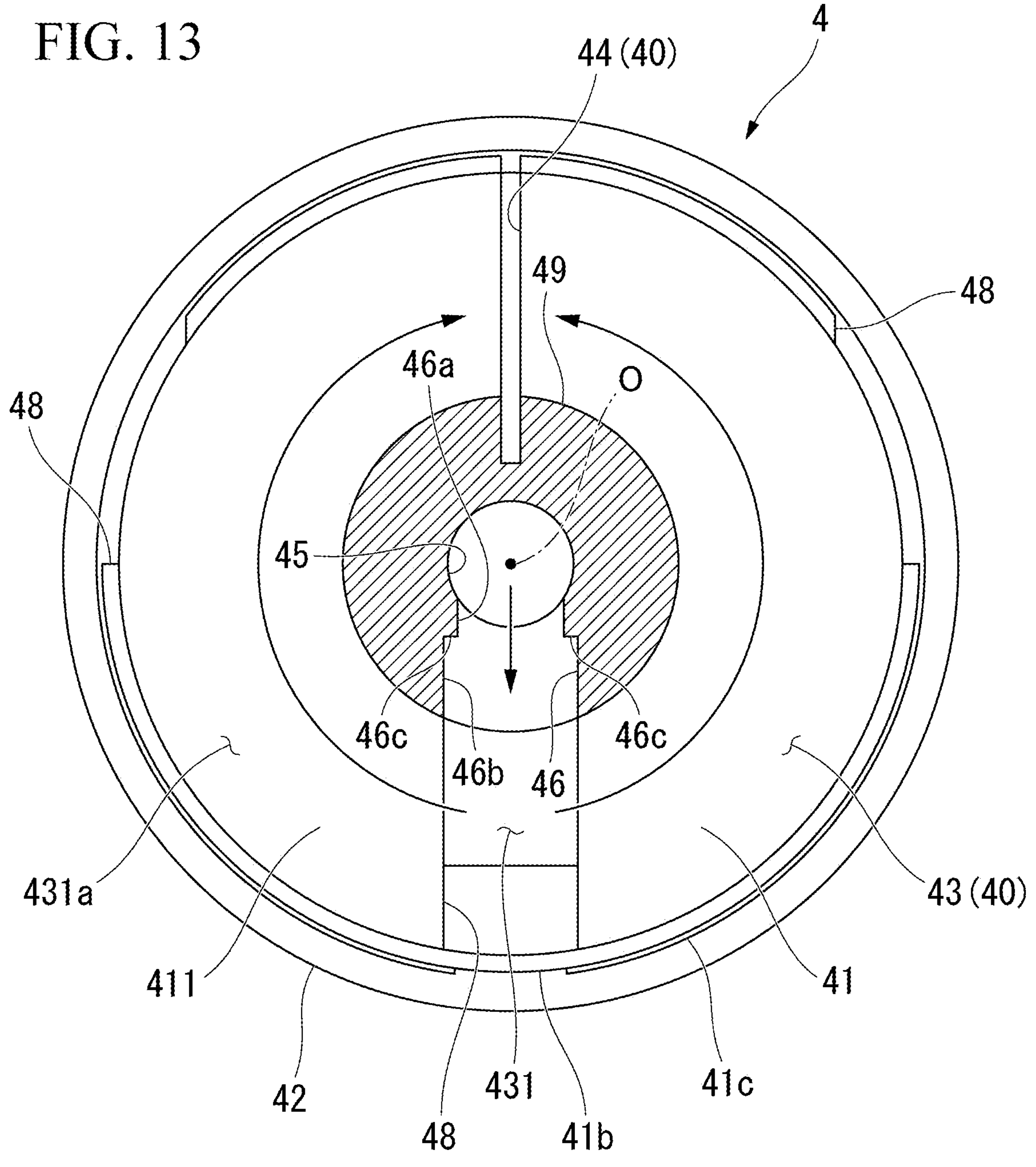
FIG. 13 is a cross-sectional view along line M-M in FIG. 10 and includes an enlarged view of FIG. 6B.
Figure 14:
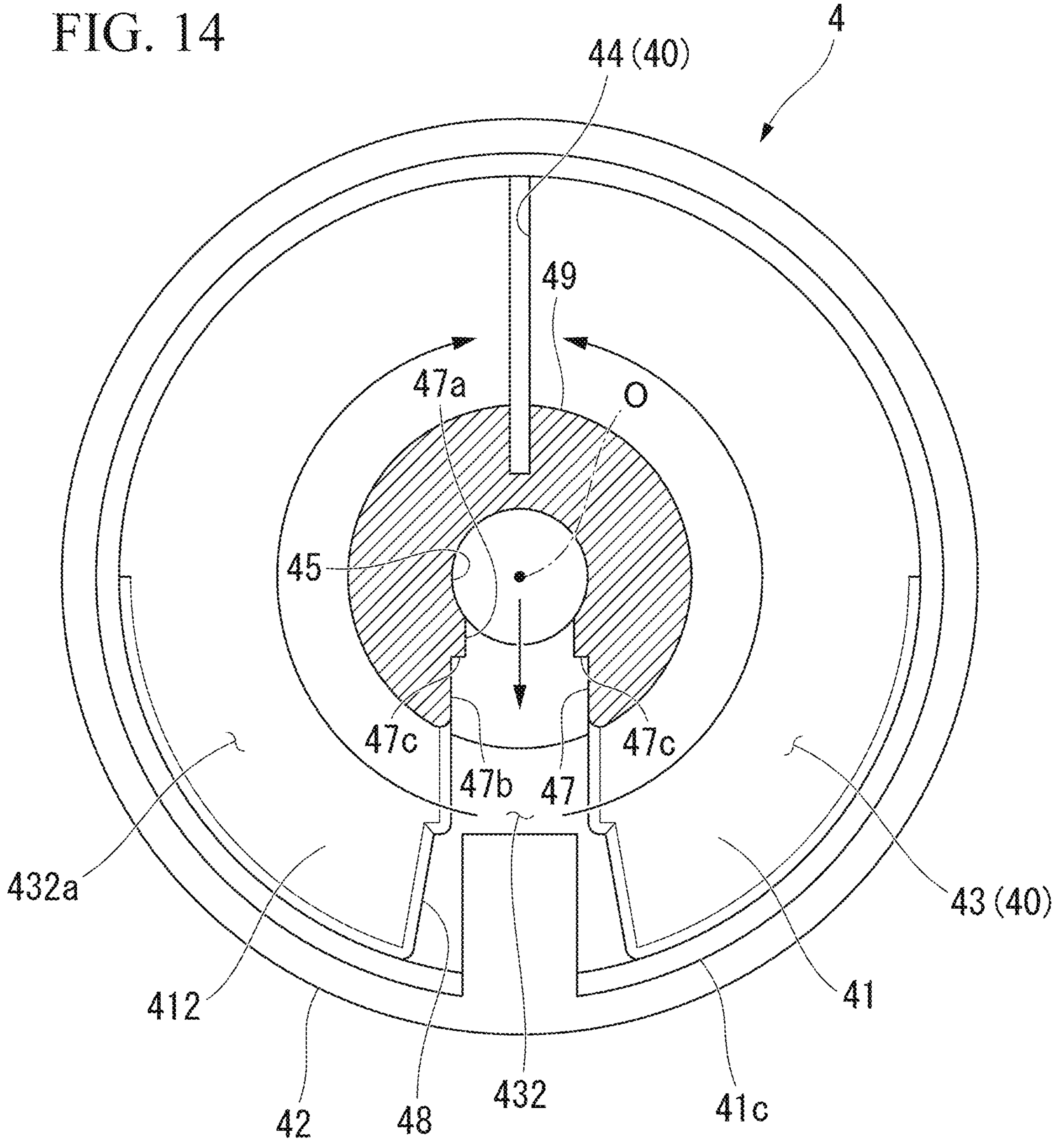
FIG. 14 is a cross-sectional view along line N-N in FIG. 10 and includes an enlarged view of FIG. 8B.

The plurality of comb teeth 41 are arranged at appropriate intervals in the front to rear direction, and each of the ink retention grooves 43 are formed between the respective comb teeth 41. A slit-shaped ink guiding groove 44 that extends in the axial direction and opens radially outward is formed in each of the plurality of comb teeth 41. The ink guiding grooves 44 provided in each of the comb teeth 41 are arranged side by side in the front to rear direction. Also, in the present embodiment, an overall shape of the plurality of ink guiding grooves 44 arranged in the front to rear direction may be referred to as (one) ink guiding groove 44. The ink guiding groove 44 communicates with each of the ink retention grooves 43 and extends in the axial direction. As shown in FIG. 13 and FIG. 14, a radially inner end portion of the ink guiding groove 44 is located radially inward than the outer circumferential surface of the cylindrical portion 49. That is, the ink guiding groove 44 penetrates each of the comb teeth 41 in the front to rear direction, is recessed radially inward from the outer circumferential surface of the cylindrical portion 49 and extends in the front to rear direction.

Figure 3A:
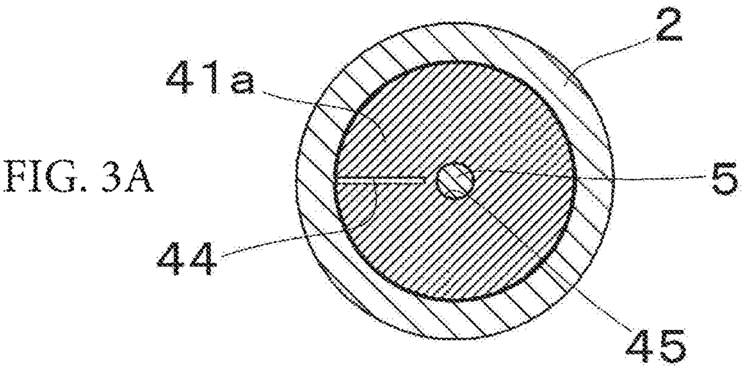
FIG. 3A is a cross-sectional view along line A-A in FIG. 2.
Figure 3B:
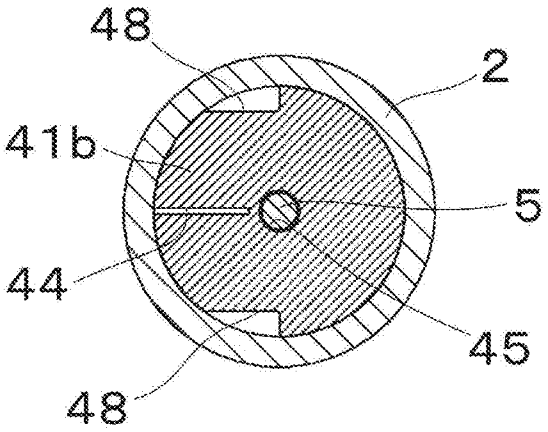
FIG. 3B is a cross-sectional view along line B-B in FIG. 2.

As shown in FIG. 2, the ink retention portion 40 configured of the ink retention grooves 43 and the ink guiding groove 44 is formed on the outer surface of the ink retention member 4. The ink retention portion 40 is formed on the outer surface of the ink retention member 4 in the front to rear direction. Specifically, the ink retention portion 40 is disposed on the outer surface of the ink retention member 4 other than the pen tip holding portion 42 located in the front-end portion. In other words, the ink retention portion 40 is arranged on the outer surface of the ink retention member 4 in a portion covered by the shaft cylinder 2. The ink guiding groove 44 does not communicate with the inner hole 45. That is, the ink guiding groove 44 does not communicate with the inner hole 45. In addition, in the present embodiment, the expression "the ink guiding groove 44 does not communicate with the inner hole 45" indicates that, for example, as shown in FIG. 3A and FIG. 3B, in a cross-section (transverse cross-section) perpendicular to the central axis O, the ink guiding groove 44 and the inner hole 45 are not connected to each other. Further, in the description of each constituent element described later, the "not communicate" may also have the same meaning as above.

As shown in FIG. 5A to FIG. 8A-FIG. 8B and FIG. 12, an air exchange groove 48 is formed in each of the plurality of comb teeth 41 at an axis-symmetrical position (180 degrees opposite side) from the ink guiding groove 44. The air exchange groove 48 is provided to penetrate each of the comb teeth 41 in the axial direction and opens radially outward. The air exchange grooves 48 of the plurality of comb teeth 41 are arranged side by side in the front to rear direction. In addition, in the present embodiment, the "axis-symmetrical position (180 degrees opposite side)" indicates that a pair of constituent elements (for example, the air exchange groove 48 and the ink guiding groove 44 described above) are arranged at positions that are 180 degrees rotationally symmetrical about the central axis O.

As shown in FIG. 2 and FIG. 3A a substantially disk-shaped rear end flange portion 41*a* is formed in a rear end portion of the comb teeth 41 group of the ink retention member 4. The rear end flange portion 41*a* has a flange shape that extends radially outward from the outer circumferential surface of the cylindrical portion 49.

The rear end flange portion 41*a* includes the ink guiding groove 44 that communicates with the ink retention grooves 43 on the front side and communicates with the ink tank 21 on the rear side. The ink guiding groove 44 of the rear end flange portion 41*a* is provided to extend in the axial direction, opens radially outward, and does not communicate with the inner hole 45. When the ink retention member 4 is inserted into a front end opening portion of the shaft cylinder 2, an outer circumferential surface of the rear end flange portion 41*a* fits into a front inner circumferential surface of the shaft cylinder 2, and the comb teeth 41 group located forward from the rear end flange portion 41*a* is maintained in a non-fitting state with an inner wall of the shaft cylinder 2. For this reason, gaps through which fluids such as ink and air can flow are provided between respective outer end portions of the plurality of comb teeth 41 and the inner circumferential surface of the shaft cylinder 2. By fitting the outer circumferential surface of the rear end flange portion 41*a* and the front inner circumferential surface of the shaft cylinder 2, the rear end flange portion 41*a* is deformed to contract radially inward. With this, a groove width, that is, a circumferential dimension, of the ink guiding groove 44 of the rear end flange portion 41*a* is formed to be smaller than a groove width of the ink guiding groove 44 of the plurality of comb teeth 41 forward from the rear end flange portion 41*a*.

As shown in FIG. 2 and FIG. 3B, a substantially disk-shaped intermediate flange portion 41*b* is formed at an intermediate portion of the comb teeth 41 group of the ink retention member 4. Also, the intermediate portion of the comb teeth 41 group specifically refers to an intermediate portion of the comb teeth 41 group in the front to rear direction, and more specifically, refers to a portion located between a front-end portion of the comb teeth 41 group and a rear end portion of the comb teeth 41 group. The intermediate flange portion 41*b* has a flange shape that extends radially outward from the outer circumferential surface of the cylindrical portion 49. At least a portion of an outer circumferential surface of the intermediate flange portion 41*b* is located radially outward from the outer end portions of the comb teeth 41. In the present embodiment, an outer diameter dimension of the intermediate flange portion 41*b* is greater than an outer diameter dimension of each of the comb teeth 41.

The intermediate flange portion 41*b* includes the ink guiding groove 44 and two air exchange grooves 48 formed on both sides of the ink guiding groove 44 in the circumferential direction to straddle the ink guiding groove 44. The ink guiding groove 44 is provided to penetrate the intermediate flange portion 41*b* in the axial direction, opens radially outward, and does not communicate with the inner hole 45.

The two air exchange grooves 48 penetrate the intermediate flange portion 41*b* in the axial direction and open radially outward. The two air exchange grooves 48 included in the intermediate flange portion 41*b* have different positions in the circumferential direction from the air exchange grooves 48 included in each of the comb teeth 41. An outer surface of the intermediate flange portion 41*b* is fitted into an inner surface of the shaft cylinder 2.

Figure 3C:
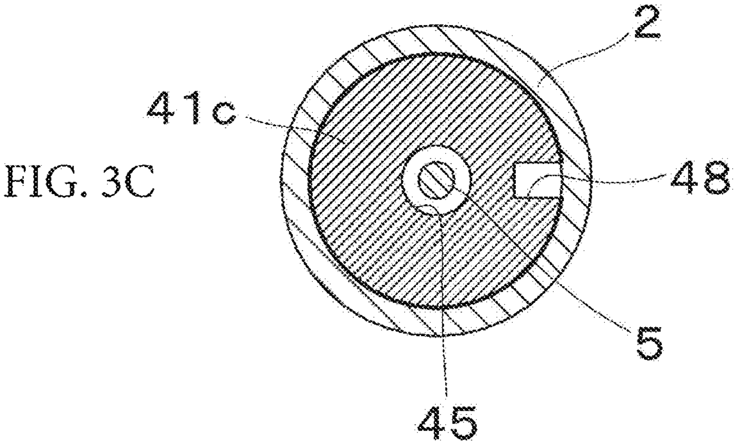
FIG. 3C is a cross-sectional view along line C-C in FIG. 2.

As shown in FIG. 2 and FIG. 3C a substantially disk-shaped front-end flange portion 41*c* is formed in the front-end portion of the comb teeth 41 group of the ink retention member 4. At least a portion of an outer circumferential surface of the front-end flange portion 41*c* is located radially outward from the outer end portions of the comb teeth 41. In the present embodiment, an outer diameter dimension of the front-end flange portion 41*c* is greater than an outer diameter dimension of each of the comb teeth 41.

An air exchange groove 48 that extends in the axial direction and opens radially outward is formed in the front-end flange portion 41*c*. The air exchange groove 48 of the front-end flange portion 41*c* is formed on the same side as the air exchange grooves 48 of the comb teeth 41 group other than the intermediate flange portion 41*b*. Specifically, the air exchange groove 48 included in the front-end flange portion 41*c* and the air exchange grooves 48 included in each of the comb teeth 41 are arranged to overlap each other when viewed in the front to rear direction. The air exchange groove 48 of the front-end flange portion 41*c* has the same position in the circumferential direction as the air exchange grooves 48 of each of the comb teeth 41. The ink guiding groove 44 is not formed in the front-end flange portion 41*c*.

Ink Guiding Member

The ink guiding member 5 is a member that has a capillary gap in the axial direction and guides the ink from the ink tank 21 to the pen tip 3. That is, the ink guiding member 5 supplies the ink from the ink tank 21 to the pen tip 3. The ink guiding member 5 is made of, for example, an injection-molded synthetic resin body, a processed fiber body, or a porous body. The ink guiding member 5 connects the inside of the ink tank 21 and the pen tip 3. The ink guiding member 5 may be configured of a single member or a plurality of members. The ink guiding member 5 may protrude rearward into the ink tank 21. That is, the ink guiding member 5 may protrude rearward from a rear end surface of the ink retention member 4, and a portion (rear end portion) thereof may be disposed inside the ink tank 21. Also, a separate ink guiding member connected to the ink guiding member 5 in the inner hole 45 may be disposed inside the ink tank 21.

First Horizontal Hole

As shown in FIG. 4, FIG. 6A-FIG. 6B, and FIG. 13, the first horizontal hole 46 is formed on the outer surface of the ink retention member 4 that opens radially outward and communicates with the inner hole 45. The first horizontal hole 46 penetrates at least a circumferential wall of the cylindrical portion 49 in the radial direction. The first horizontal hole 46 is formed at an axis-symmetrical position with the ink guiding groove 44 (that is, 180 degrees opposite side). The first horizontal hole 46 and the ink guiding groove 44 are formed not to communicate with each other in a transverse cross-section thereof.

As shown in FIG. 2, the first horizontal hole 46 is formed in a rear half portion of the ink retention portion 40. Preferably, a distance L1 in the longitudinal direction from a rear end of the ink retention portion 40 to a rear end of the first horizontal hole 46 is set to a range of 5% to 45% of a total longitudinal dimension L of the ink retention portion 40. In the present embodiment, the total longitudinal dimension L corresponds to a distance in the longitudinal direction from a front end of the ink guiding groove 44 to a rear end of the ink guiding groove 44. The distance L1 is preferably set to a range of 15% to 30% of the total longitudinal dimension L. In the first horizontal hole 46, for example, when the total longitudinal dimension L of the ink retention portion 40 is set to 30 mm, the distance L1 in the longitudinal direction from the rear end of the ink retention portion 40 to the rear end of the first horizontal hole 46 is set to a range of 1.5 mm to 13.5 mm (preferably 4.5 mm to 9 mm). The rear half portion of the ink retention portion 40 refers to the rear part of the ink retention portion 40 from a midpoint of the total longitudinal dimension L. In other words, the rear half portion of the ink retention portion 40 refers to a portion of the ink retention portion 40 located rearward from a center (midpoint) in the front to rear direction.

As shown in FIG. 6A-FIG. 6B, FIG. 9A, FIG. 11A, and FIG. 13, the first horizontal hole 46 axially penetrates a plurality of (specifically, three) comb teeth 411 arranged in the axial direction and opens radially outward. The first horizontal hole 46 communicates with a plurality of (specifically, four) ink retention grooves 431 and 431*a* adjacent forwardly and rearwardly to the comb teeth 411 in which the first horizontal hole 46 is formed.

Figure 11A:
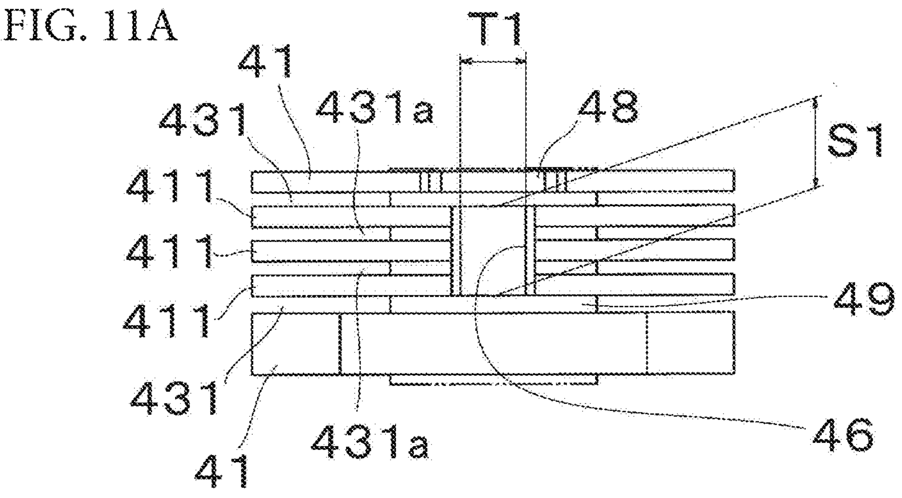
FIG. 11A is an enlarged view of section J in FIG. 10.

A shape of an opening portion of the first horizontal hole 46 is a rectangular shape when the first horizontal hole 46 is viewed from the outside in the radial direction, as shown in FIG. 11A. The opening portion of the first horizontal hole 46 is set, for example, to have a length S1 in the longitudinal direction of 1 mm to 2 mm, and a length T1 in a width direction (counter-longitudinal direction) of 1 mm to 2 mm. In the present embodiment, the width direction may be referred to as a lateral direction or a circumferential direction. Also, the lengths S1 and T1 correspond to opening dimensions of a portion of the first horizontal hole 46 that opens into the inner hole 45 (a first inner opening portion 46*a*, which will be described later). The length S1 in the longitudinal direction of the opening portion of the first horizontal hole 46 is determined by a sum of plate thicknesses of the three comb teeth 411 in which the first horizontal hole 46 is formed, and groove widths (axial dimensions) of the two ink retention grooves 431*a* formed by the three comb teeth 411. The area of the opening portion of the first horizontal hole 46 is set to, for example, 1 $mm^2$ to 4 $mm^2$. The length T1 in the width direction of the opening portion of the first horizontal hole 46 is set, for example, to a range of 60% to 85% (preferably 65% to 80%) of an inner diameter of the inner hole 45. In addition to the rectangular shape, the shape of the opening portion of the first horizontal hole 46 may be a circular shape, an elliptical shape, another quadrangular shape such as a square shape, a polygon other than a quadrangular shape, or the like.

Also, the first horizontal hole 46 may have any configuration as long as it is provided to penetrate at least one comb tooth 411 in the axial direction and opens radially outward. Further, the first horizontal hole 46 may be configured to communicate with the ink retention grooves 431 and 431*a* adjacent forwardly or rearwardly to at least one comb tooth 411 having the first horizontal hole 46. Preferably, a configuration in which the first horizontal hole 46 communicates with the plurality of ink retention grooves 431 and 431*a* adjacent forwardly and rearwardly to at least one comb tooth 411 having the first horizontal hole 46 may be exemplified. That is, the first horizontal hole 46 is provided to penetrate at least one comb tooth 411 (41) in the axial direction and communicates with the ink retention grooves 431 and 431*a* (43) adjacent to the comb tooth 411.

Figure 4:
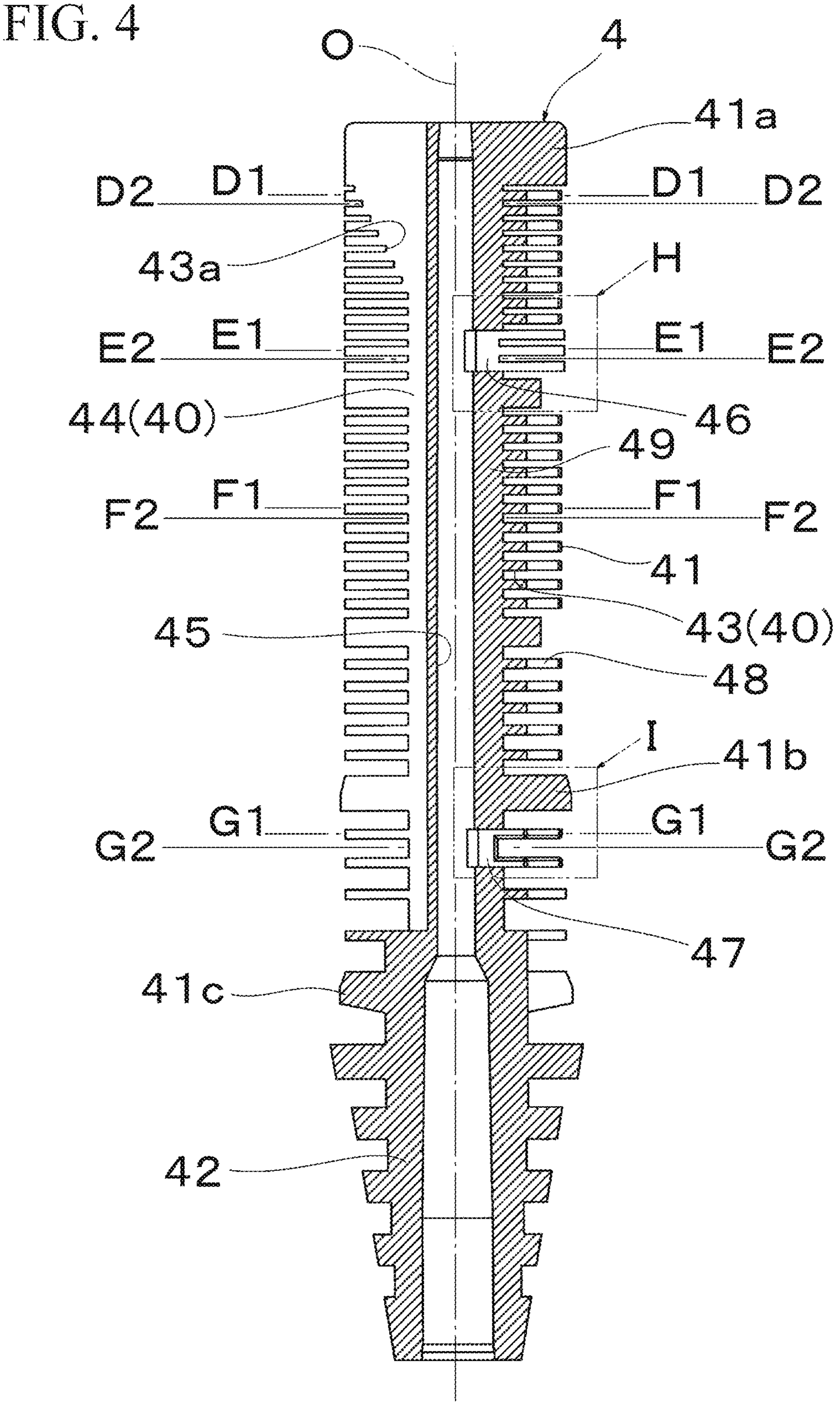
FIG. 4 is a longitudinal cross-sectional view of an ink retention member in FIG. 1.
Figure 5A:
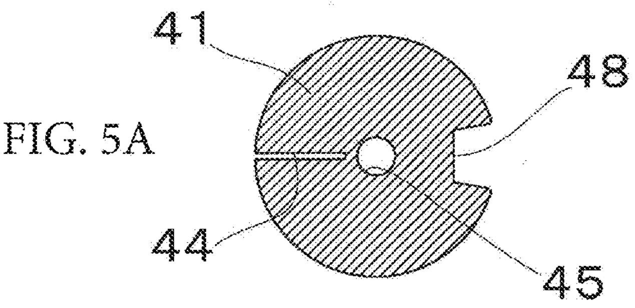
FIG. 5A is a cross-sectional view along line D1-D1 in FIG. 4.
Figure 5B:
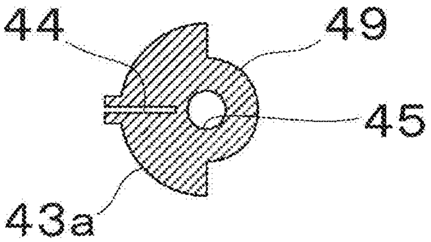
FIG. 5B is a cross-sectional view along line D2-D2 in FIG. 4.
Figure 6A:
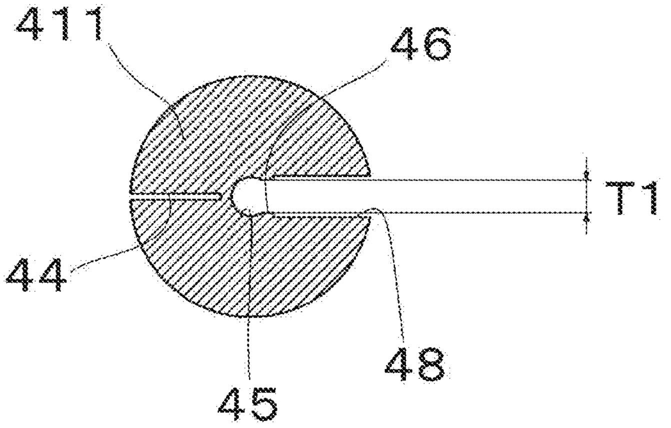
FIG. 6A is a cross-sectional view along line E1-E1 in FIG. 4.
Figure 6B:
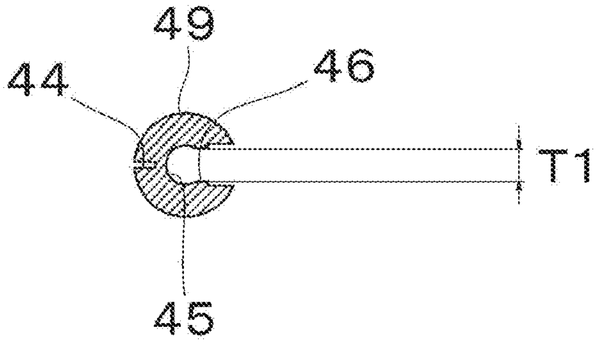
FIG. 6B is a cross-sectional view along line E2-E2 in FIG. 4.
Figure 7A:
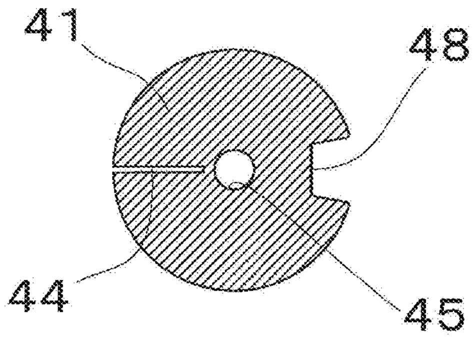
FIG. 7A is a cross-sectional view along line F1-F1 in FIG. 4.
Figure 7B:
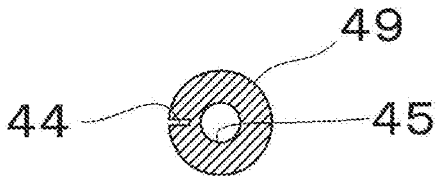
FIG. 7B is a cross-sectional view along line F2-F2 in FIG. 4.

As shown in FIG. 4 and FIG. 5A-FIG. 5B, in the vicinity of the rear end flange portion 41*a* on a side having the ink guiding groove 44 in the circumferential direction, a shallow groove region 43*a* in which radial depths of the ink retention grooves 43 gradually become shallower toward the rear side is provided. Thus, the area of an inner wall of the ink guiding groove 44 in the vicinity of the ink tank 21 is increased, and smooth ink circulation with the ink tank 21 is made possible. Further, the first horizontal hole 46 is formed forward from the shallow groove region 43*a* of the ink retention grooves 43. Thus, when the ink freezes, an ink flow path in the ink guiding groove 44 in the shallow groove region 43*a* is strongly closed by the frozen ink, an amount of volumetric expansion of the frozen ink in the ink tank 21 is smoothly discharged from the inner hole 45 through the first horizontal hole 46 to the outside (ink retention portion 40).

As shown in FIGS. 5A to FIG. 8A-FIG. 8B and FIG. 12, the air exchange grooves 48 that extend in the axial direction are formed in each of the comb teeth 41, 411, and 412. The air exchange grooves 48 are formed at locations of each of the comb teeth 41, 411, and 412 other than the ink guiding groove 44 (specifically, at axis-symmetrical positions with the ink guiding groove 44). As shown in FIG. 6A, the first horizontal hole 46 communicates with the air exchange grooves 48 in the radial direction. As shown in FIG. 11A, the air exchange groove 48 that communicates with the first horizontal hole 46 in the radial direction is formed at the same position (that is, at an axis-symmetrical position with the ink guiding groove 44) in the circumferential direction as the air exchange groove 48 formed in the comb teeth 41 adjacent to the comb teeth 411 having the first horizontal hole 46. Thus, manufacturing of a mold for forming the ink retention member 4 is facilitated.

Second Horizontal Hole

As shown in FIGS. 4, FIG. 8A-FIG. 8B, and FIG. 14, the second horizontal hole 47 that communicates with the inner hole 45 and opens radially outward is formed on the outer surface of the ink retention member 4 forward from the first horizontal hole 46. The second horizontal hole 47 penetrates at least the circumferential wall of the cylindrical portion 49 in the radial direction. The second horizontal hole 47 is formed at an axis-symmetrical position with the ink guiding groove 44 (that is, 180 degrees opposite side). The second horizontal hole 47 and the ink guiding groove 44 are formed not to communicate with each other in a transverse cross-section thereof.

Figure 8A:
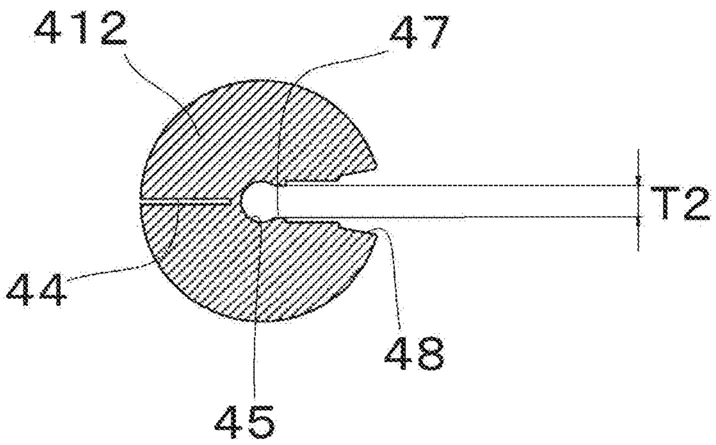
FIG. 8A is a cross-sectional view along line G1-G1 in FIG. 4.
Figure 8B:
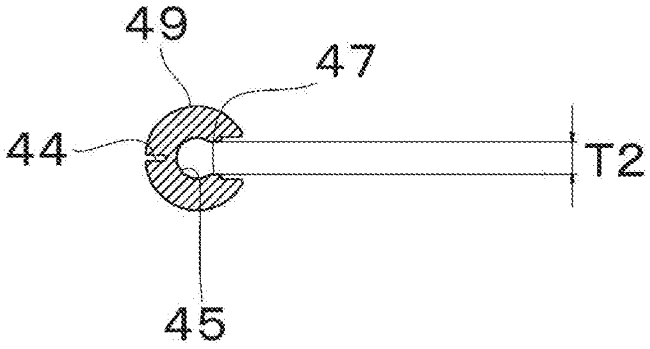
FIG. 8B is a cross-sectional view along line G2-G2 in FIG. 4.
Figure 9A:
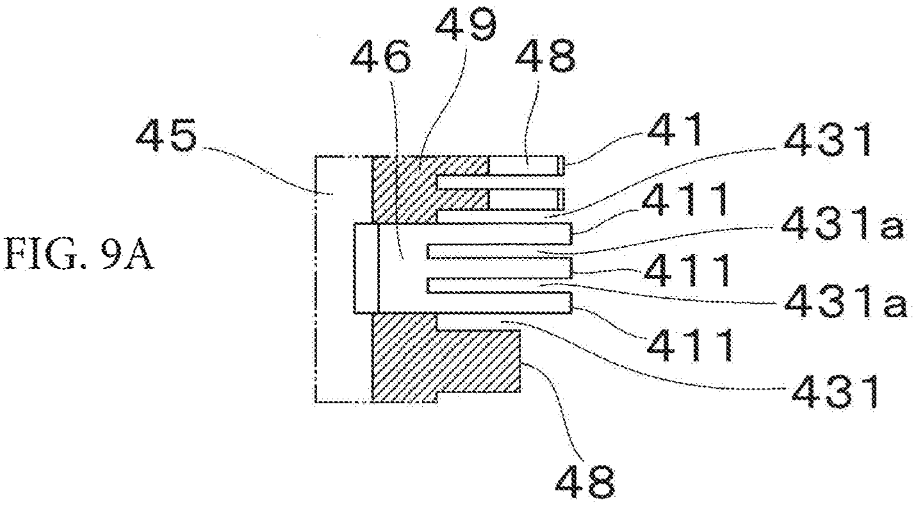
FIG. 9A is an enlarged view of section H in FIG. 4.
Figure 9B:
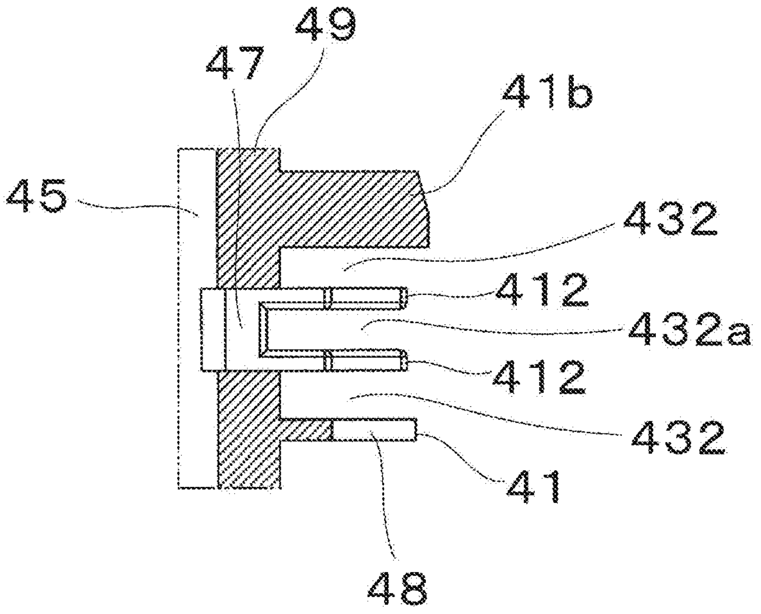
FIG. 9B is an enlarged view of section I in FIG. 4.
Figure 10:
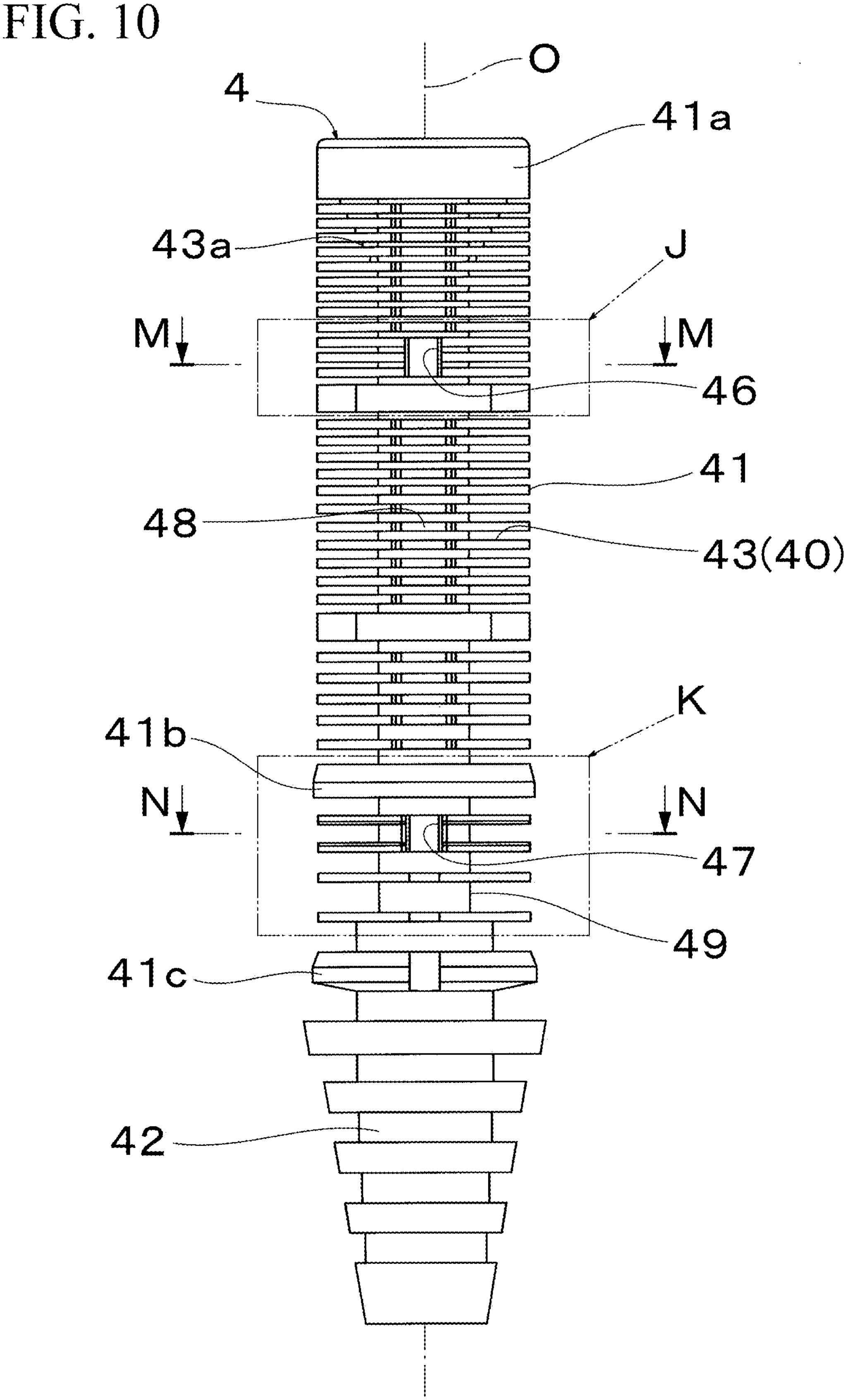
FIG. 10 is a side view of the ink retention member in FIG. 1, that is, a diagram of the ink retention member viewed from an opening portion side of a first horizontal hole and an opening portion side of a second horizontal hole.
Figure 11B:
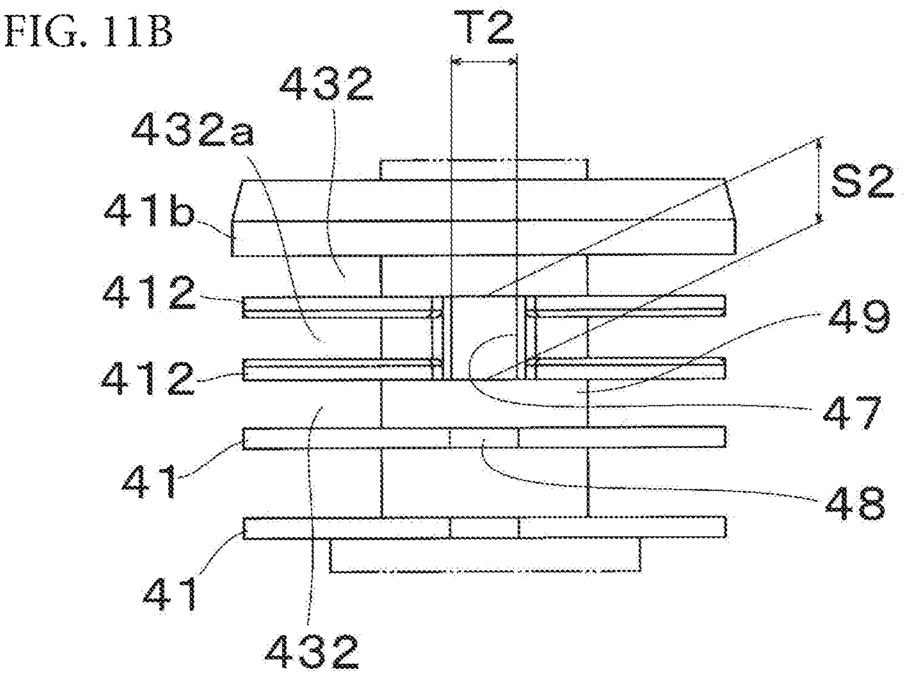
FIG. 11B is an enlarged view of section K in FIG. 10.
Figure 12:
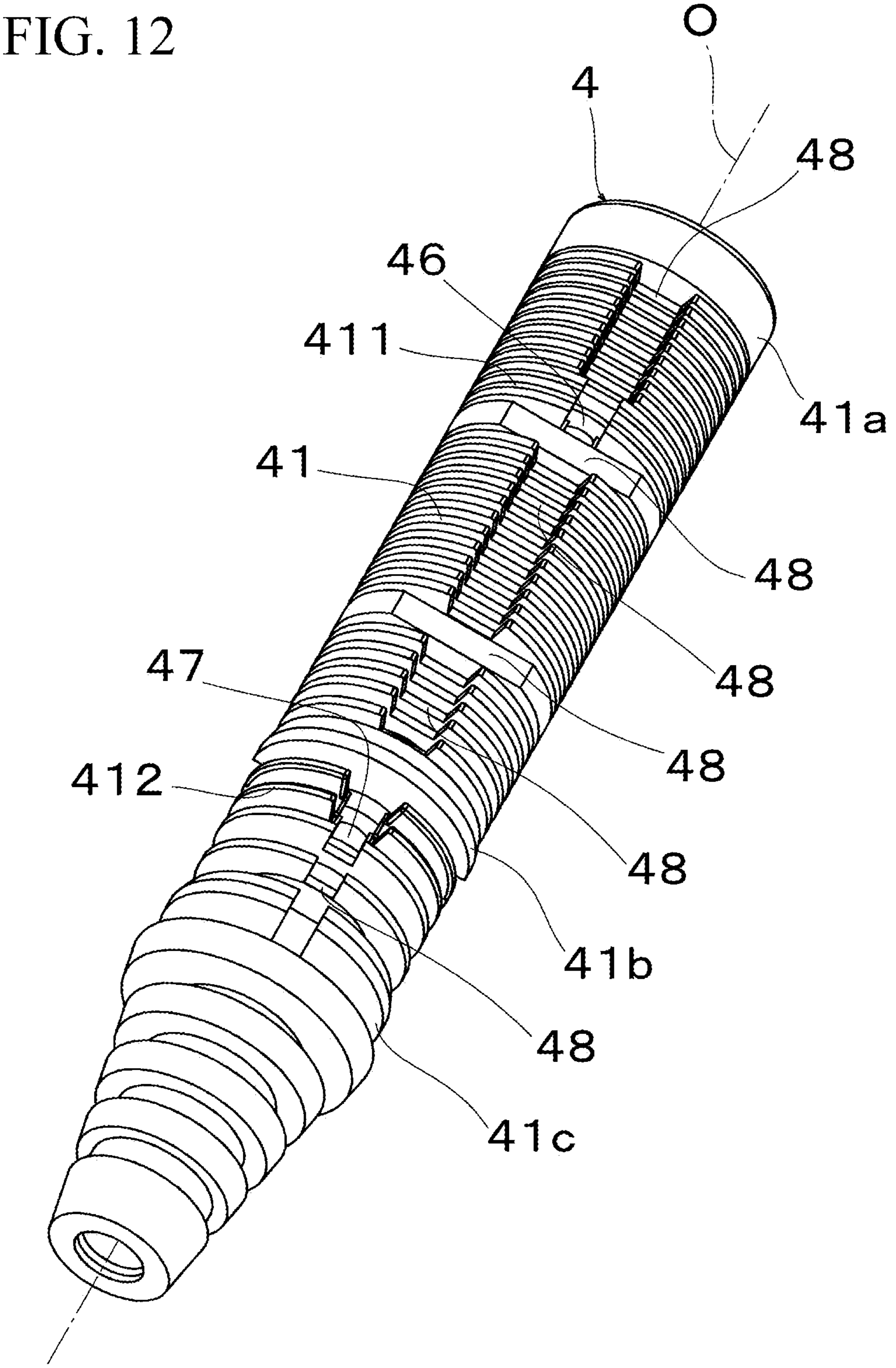
FIG. 12 is a perspective view of the ink retention member in FIG. 1.

As shown in FIG. 8A, the second horizontal hole 47 communicates with the air exchange grooves 48 in the radial direction. As shown in FIG. 11B, the air exchange groove 48 that communicates with the second horizontal hole 47 in the radial direction is formed at the same position (that is, at an axis-symmetrical position with the ink guiding groove 44) in the circumferential direction as the air exchange groove 48 formed in the comb teeth 41 adjacent to the comb teeth 412 having the second horizontal hole 47. Thus, manufacturing of the mold for forming the ink retention member 4 is facilitated.

As shown in FIG. 2, the second horizontal hole 47 is formed in a front half portion of the ink retention portion 40. A distance L2 in the longitudinal direction from a rear end of the first horizontal hole 46 to a rear end of the second horizontal hole 47 is set to 30% or more (preferably 40% or more) of the total longitudinal dimension L of the ink retention portion 40. The front half portion of the ink retention portion 40 refers to a portion forward from the midpoint of the total longitudinal dimension L of the ink retention portion 40. In other words, the front half portion of the ink retention portion 40 refers to a portion of the ink retention portion 40 located forward from the center (midpoint) in the front to rear direction.

As shown in FIG. 8A-FIG. 8B, FIG. 9B, FIG. 11B, and FIG. 14, the second horizontal hole 47 is provided to axially penetrate a plurality of (specifically, two) comb teeth 412 arranged in the axial direction and opens radially outward. The second horizontal hole 47 communicates with a plurality of (specifically, three) ink retention grooves 432 and 432*a* adjacent forwardly and rearwardly to the comb teeth 412 in which the second horizontal hole 47 is formed.

As shown in FIG. 11B, a shape of an opening portion of the second horizontal hole 47 is a rectangular shape when the second horizontal hole 47 is viewed from the outside in the radial direction. The opening portion of the second horizontal hole 47 is set, for example, to have a length S2 in the longitudinal direction of 1 mm to 2 mm, and a length T2 in the width direction (counter-longitudinal direction) of 1 mm to 2 mm. Also, the lengths S2 and T2 correspond to opening dimensions of a portion of the second horizontal hole 47 that opens into the inner hole 45 (a second inner opening portion 47*a*, which will be described later). The length S2 in the longitudinal direction of the opening portion of the second horizontal hole 47 is determined by a sum of plate thicknesses of the two comb teeth 412 in which the second horizontal hole 47 is formed, and a groove width (axial dimension) of one ink retention groove 432*a* formed by the two comb teeth 412. The length S2 in the longitudinal direction of the opening portion of the second horizontal hole 47 is formed to be greater than the groove width of the ink retention groove 432*a* in which the second horizontal hole 47 is formed. The area of the opening portion of the second horizontal hole 47 is set to, for example, 1 $mm^2$ to 4 $mm^2$. The length T2 in the width direction of the opening portion of the second horizontal hole 47 is set, for example, to a range of 60% to 85% (preferably 65% to 80%) of the inner diameter of the inner hole 45. In addition to the rectangular shape, the shape of the opening portion of the second horizontal hole 47 may be a circular shape, an elliptical shape, a different quadrangular shape such as a square shape, a polygon other than a quadrangular shape, or the like.

Also, the second horizontal hole 47 may be configured to penetrate at least one comb tooth 412 in the axial direction and open radially outward. Further, the second horizontal hole 47 may be configured to communicate with the ink retention grooves 432 and 432*a* adjacent forwardly or rearwardly to at least one comb tooth 412 having the second horizontal hole 47. Preferably, a configuration in which the second horizontal hole 47 communicates with the plurality of ink retention grooves 432 and 432*a* adjacent forwardly and rearwardly to at least one comb tooth 412 having the second horizontal hole 47 is exemplified. That is, the second horizontal hole 47 is provided to penetrate at least one comb tooth 412 (41) in the axial direction and communicates with the ink retention grooves 432 and 432*a* (43) adjacent to the comb tooth 412.

Configurations of the horizontal holes 46 and 47 will be explained in more detail. As shown in FIGS. 13 and 14, the horizontal holes 46 and 47 include the inner opening portions 46*a* and 47*a* that open into the inner hole 45, outer opening portions 46*b* and 47*b* that open radially outward, and step portions 46*c* and 47*c* that are disposed between the inner opening portions 46*a* and 47*a* and the outer opening portions 46*b* and 47*b* and face radially outward.

Specifically, as shown in FIG. 13, the first horizontal hole 46 includes the first inner opening portion 46*a* that opens into the inner hole 45, the first outer opening portion 46*b* that opens radially outward, and the first step portion 46*c* that is disposed between the first inner opening portion 46*a* and the first outer opening portion 46*b* and faces radially outward.

The first inner opening portion 46*a* is disposed in a radially inner end portion of the first horizontal hole 46 and connected to the inner hole 45. The first outer opening portion 46*b* is disposed radially outward from the first inner opening portion 46*a* and communicates with the air exchange groove 48 and the ink retention grooves 431 and 431*a*. In the present embodiment, a dimension in the width direction (circumferential direction) of the first outer opening portion 46*b* is greater than a dimension in the width direction (the length T1) of the first inner opening portion 46*a*. In addition, a dimension in the longitudinal direction (front to rear direction) of the first outer opening portion 46*b* is the same as a dimension in the longitudinal direction (the length S1) of the first inner opening portion 46*a*.

The first step portion 46*c* connects the first inner opening portion 46*a* to the first outer opening portion 46*b*. In the present embodiment, a pair of first step portions 46*c* are provided at both end portions in the width direction (circumferential direction) of an inner wall of the first horizontal hole 46. The pair of first step portions 46*c* are disposed on a pair of longer sides among four sides of the first horizontal hole 46, which form a rectangular opening shape, and extend in the axial direction (see FIG. 11A).

The pair of first step portions 46*c* each have a planar shape that extends in directions perpendicular to a predetermined radial direction in which the first horizontal hole 46 extends. However, the present invention is not limited thereto, and although not particularly illustrated, the pair of first step portions 46*c* may have a planar shape that is inclined with respect to the predetermined radial direction and extends radially outward as they are separated from each other in the width direction. Alternatively, the pair of first step portions 46*c* may have a planar shape that is inclined with respect to the predetermined radial direction and extends radially inward as they are separated from each other in the width direction. Also, the first step portion 46*c* is not limited to a planar shape, but may have a convex curved shape, a concave curved shape, or the like.

As shown in FIG. 14, the second horizontal hole 47 includes the second inner opening portion 47*a* that opens into the inner hole 45, the second outer opening portion 47*b* that opens radially outward, and the second step portion 47*c* that is disposed between the second inner opening portion 47*a* and the second outer opening portion 47*b* and faces radially outward.

The second inner opening portion 47*a* is disposed in a radially inner end portion of the second horizontal hole 47 and connected to the inner hole 45. The second outer opening portion 47*b* is disposed radially outward from the second inner opening portion 47*a* and communicates with the air exchange groove 48 and the ink retention grooves 432 and 432*a*. In the present embodiment, the dimension in the width direction (circumferential direction) of the second outer opening portion 47*b* is greater than a dimension in the width direction (the length T2) of the second inner opening portion 47*a*. Further, a dimension in the longitudinal direction (front to rear direction) of the second outer opening portion 47*b* is the same as a dimension in the longitudinal direction (the length S2) of the second inner opening portion 47*a*.

The second step portion 47*c* connects the second inner opening portion 47*a* to the second outer opening portion 47*b*. In the present embodiment, a pair of second step portions 47*c* are provided at both end portions of an inner wall of the second horizontal hole 47 in the width direction (circumferential direction). The pair of second step portions 47*c* are disposed on a pair of longer sides among four sides of the second horizontal hole 47, which form a rectangular opening shape, and extend in the axial direction (see FIG. 11B).

The pair of second step portions 47*c* each have a planar shape that extends in a direction perpendicular to a predetermined radial direction in which the second horizontal hole 47 extends. However, the present invention is not limited thereto, and although not particularly illustrated, the pair of second step portions 47*c* may have a planar shape that is inclined with respect to the predetermined radial direction and extends radially outward as they are separated from each other in the width direction. Alternatively, the pair of second step portions 47*c* may have a planar shape that is inclined with respect to the predetermined radial direction and extends radially inward as they are separated from each other in the width direction. Further, the second step portion 47*c* is not limited to a planar shape, but may have a convex curved shape, a concave curved shape, or the like.

As explained above, the writing implement 1 of the present embodiment is the writing implement 1 including the pen tip 3, the ink tank 21 that directly retains the ink, the ink retention member 4 that includes the pen tip 3 at the front-end portion, is provided on the front side of the ink tank 21, and temporarily retains the overflow ink accompanying an increase in pressure in the ink tank 21, and the ink guiding member 5 that is provided inside the ink retention member 4 and supplies the ink from the ink tank 21 to the pen tip 3, wherein the ink retention member 4 includes the plurality of plate-shaped comb teeth 41 formed at intervals on the outer surface, the plurality of ink retention grooves 43 that are formed between the comb teeth 41 and temporarily retain the ink, the axially extending slit-shaped ink guiding groove 44 that communicates with the ink tank 21 and communicates with each of the ink retention grooves 43, the ink retention portion 40 that is formed on the outer surface in the front to rear direction and includes of the ink retention grooves 43 and the ink guiding groove 44, and the inner hole 45 that is provided to extend in the axial direction and has the ink guiding member 5 provided therein, the ink retention member 4 includes the first horizontal hole 46 that opens radially outward and communicates with the inner hole 45, the first horizontal hole 46 and the ink guiding groove 44 are formed not to communicate with each other in the transverse cross-section, and the first horizontal hole 46 is provided in the rear half portion of the ink retention portion 40.

Thus, even if the ink in the ink tank 21 freezes with the pen tip 3 facing downward, the writing implement 1 of the present embodiment can quickly and reliably discharge the ink to the outside (the ink retention portion 40) from the first horizontal hole 46 near the ink tank 21 before the ink pushed out from the ink tank 21 reaches the vicinity of the pen tip 3. As a result, ink leakage from the pen tip 3 when the ink in the ink tank 21 freezes can be reliably prevented.

In the writing implement 1 of the present embodiment, the ink retention member 4 includes the second horizontal hole 47 that is disposed forward from the first horizontal hole 46, opens radially outward, and communicates with the inner hole 45, and the second horizontal hole 47 and the ink guiding groove 44 are formed not to communicate with each other in the transverse cross-section.

Thus, in the writing implement 1 of the present embodiment, when the ink freezes, the amount of volumetric expansion of the frozen ink in the ink tank 21 is mainly discharged to the outside through the first horizontal hole 46, and the amount of volumetric expansion of the frozen ink inside the inner hole 45 is discharged to the outside through the second horizontal hole 47. As a result, ink leakage from the pen tip 3 when the ink freezes can be more reliably prevented. In addition, in the writing implement 1 of the present embodiment, when the ink in the ink tank 21 is first drawn out to the pen tip 3 (that is, at the time of initial ink discharging), the residual air inside the inner hole 45 can be reliably discharged to the outside from the second horizontal hole 47, and the ink can be quickly drawn out from the ink tank 21 to the pen tip 3. Although the writing implement 1 of the present embodiment may have a configuration in which only the first horizontal hole 46 is provided, it is preferable to provide the second horizontal hole 47.

In the writing implement 1 of the present embodiment, the first horizontal hole 46 is provided to penetrate at least one comb tooth 411 in the axial direction and communicates with the ink retention grooves 431 and 431*a* adjacent to the comb tooth 411. Specifically, the first horizontal hole 46 is provided to penetrate the plurality of comb teeth 411 in the axial direction and communicates with the plurality of ink retention grooves 431 and 431*a* adjacent forwardly and rearwardly to each of the comb teeth 411.

Thus, the writing implement 1 of the present embodiment can secure a sufficient opening area of the first horizontal hole 46, and when the ink freezes, the overflow ink from the first horizontal hole 46 can be reliably discharged to the outside. Further, when the ink freezes, the writing implement 1 according to the present embodiment can discharge the overflow ink from the first horizontal hole 46 into the ink retention grooves 431 and 431*a* (specifically, the plurality of ink retention grooves 431 and 431*a*). Thus, when the pressure inside the ink tank 21 is reduced after the ink thaws, the ink in the ink retention grooves 431 and 431*a* is quickly collected into the ink tank 21 through the ink guiding groove 44. As a result, ink remaining in the vicinity of the first horizontal hole 46 can be avoided.

In the writing implement 1 of the present embodiment, the second horizontal hole 47 is provided to penetrate at least one comb tooth 412 in the axial direction and communicates with ink retention grooves 432 and 432*a* adjacent to the comb tooth 412. Specifically, the second horizontal hole 47 is provided to penetrate the plurality of comb teeth 412 in the axial direction and communicates with the plurality of ink retention grooves 432 and 432*a* adjacent forwardly and rearwardly to each of the comb teeth 412.

Thus, the writing implement 1 of the present embodiment can secure a sufficient opening area of the second horizontal hole 47, and when the ink freezes, the overflow ink from the second horizontal hole 47 can be reliably discharged to the outside. Further, when the ink freezes, the writing implement 1 of the present embodiment can discharge the overflow ink from the second horizontal hole 47 into the ink retention grooves 432 and 432*a* (specifically, the plurality of ink retention grooves 432 and 432*a*). Thus, when the pressure inside the ink tank 21 is reduced after the ink thaws, the ink in the ink retention grooves 432 and 432*a* is quickly collected into the ink tank 21 through the ink guiding groove 44. As a result, ink remaining in the vicinity of the second horizontal hole 47 can be avoided.

In particular, in the writing implement 1 of the present embodiment, the first horizontal hole 46 and the second horizontal hole 47 are provided to penetrate at least one comb tooth 41 in the axial direction and communicate with the ink retention grooves 43 adjacent to the comb tooth 41. Thus, when the ink freezes, the overflow ink inside the inner hole 45 can be reliably discharged to the outside, and after the ink thaws, ink remaining in the vicinity of the first horizontal hole 46 and ink remaining in the vicinity of the second horizontal hole 47 can be avoided.

In the writing implement 1 of the present embodiment, the first horizontal hole 46 includes the first inner opening portion 46*a* that opens into the inner hole 45, the first outer opening portion 46*b* that opens radially outward, and the first step portion 46*c* that is disposed between the first inner opening portion 46*a* and the first outer opening portion 46*b* and faces radially outward.

Thus, in the writing implement 1 of the present embodiment, the first step portion 46*c* prevents the ink discharged from the inner hole 45 to the outside through the first horizontal hole 46 from returning to the inside of the inner hole 45. According to the present embodiment, it is possible to prevent problems such as ink leaking from the pen tip 3 due to the overflow ink unintentionally returning from the first horizontal hole 46 to the inner hole 45.

As flows of the ink are shown by arrows in FIG. 13, more specifically, the overflow ink discharged from the inner hole 45 to the outside through the first horizontal hole 46 is prevented from flowing back into the inner hole 45 due to the function of the first step portion 46*c*. Then, the overflow ink stably flows from the first horizontal hole 46 to the ink guiding groove 44 through the ink retention grooves 431 and 431*a* due to the capillary force. The overflow ink is efficiently collected from the ink guiding groove 44 into the ink tank 21.

In the writing implement 1 of the present embodiment, the second horizontal hole 47 includes the second inner opening portion 47*a* that opens into the inner hole 45, the second outer opening portion 47*b* that opens radially outward, and the second step portion 47*c* that is disposed between the second inner opening portion 47*a* and the second outer opening portion 47*b* and faces radially outward.

Thus, in the writing implement 1 of the present embodiment, the second step portion 47*c* can prevent the ink discharged from the inner hole 45 to the outside through the second horizontal hole 47 from returning to the inside of the inner hole 45. According to the present embodiment, it is possible to prevent problems such as ink leaking from the pen tip 3 due to the overflow ink unintentionally returning from the second horizontal hole 47 to the inner hole 45.

As flows of the ink are shown by arrows in FIG. 14, more specifically, the overflow ink discharged from the inner hole 45 to the outside through the second horizontal hole 47 is prevented from flowing back into the inner hole 45 due to the function of the second step portion 47*c*. Then, the overflow ink stably flows from the second horizontal hole 47 to the ink guiding groove 44 through the ink retention grooves 432 and 432*a* due to the capillary force. The overflow ink is efficiently collected from the ink guiding groove 44 into the ink tank 21.

The writing implement 1 of the present embodiment is the writing implement 1 including the pen tip 3, the ink tank 21 that directly retains the ink, the ink retention member 4 that includes the pen tip 3 at the front-end portion, is provided on the front side of the ink tank 21, and temporarily retains the overflow ink accompanying an increase in pressure in the ink tank 21, and the ink guiding member 5 that is provided inside the ink retention member 4 and supplies the ink from the ink tank 21 to the pen tip 3, wherein the ink retention member 4 includes the plurality of plate-shaped comb teeth 41 formed at intervals on the outer surface, the plurality of ink retention grooves 43 that are formed between the comb teeth 41 and temporarily retain the ink, the axially extending slit-shaped ink guiding groove 44 that communicates with the ink tank 21 and communicates with each of the ink retention grooves 43, and the inner hole 45 that is provided to extend in the axial direction and has the ink guiding member 5 provided therein, the ink retention member 4 includes the horizontal hole (the first horizontal hole 46 and/or the second horizontal hole 47) that opens radially outward and communicates with the inner hole 45, the horizontal holes 46 and 47 and the ink guiding groove 44 are formed not to communicate with each other in the transverse cross-section, and the horizontal holes 46 and 47 are provided to penetrate at least one comb tooth 41 in the axial direction and communicate with the ink retention grooves 43 adjacent to the comb tooth 41. Specifically, the horizontal holes 46 and 47 are provided to penetrate the plurality of comb teeth 41 in the axial direction and communicate with the plurality of ink retention grooves 43 adjacent forwardly and rearwardly to each of the comb teeth 41.

Thus, the writing implement 1 of the present embodiment can secure a sufficient opening area for the horizontal holes 46 and 47, and when the ink freezes, the overflow ink from the horizontal holes 46 and 47 can be reliably discharged to the outside. Further, when the ink freezes, the writing implement 1 of the present embodiment can discharge the overflow ink from the horizontal holes 46 and 47 into the ink retention grooves 43 (specifically, the plurality of ink retention grooves 43). Thus, when the pressure inside the ink tank 21 is reduced after the ink thaws, the ink in the ink retention grooves 43 is quickly collected into the ink tank 21 through the ink guiding groove 44. As a result, ink remaining in the vicinity of the horizontal holes 46 and 47 can be avoided.

Also, in the present embodiment, the number of horizontal holes 46 and 47 provided and the positions thereof are not limited to the above-described embodiment. That is, the numbers, the positions, and the like of the horizontal holes 46 and 47 that are provided to penetrate at least one comb tooth 41 in the axial direction and communicate with the ink retention grooves 43 adjacent to the comb tooth 41 are not limited to the present embodiment. For example, a configuration in which the horizontal holes are provided in two locations on the front and rear sides, a configuration in which only one horizontal hole is provided in the rear half portion of the ink retention portion 40, a configuration in which only one horizontal hole is provided in a central portion of the ink retention portion 40, a configuration in which only one horizontal hole is provided in the front half portion of the ink retention portion 40, and the like can be exemplified.

In the writing implement 1 of the present embodiment, the horizontal holes 46 and 47 include the inner opening portions 46*a* and 47*a* that open into the inner hole 45, the outer opening portions 46*b* and 47*b* that open radially outward, and the step portions 46*c* and 47*c* that are disposed between the inner opening portions 46*a* and 47*a* and the outer opening portions 46*b* and 47*b* and face radially outward.

Also, the writing implement 1 of the present embodiment is the writing implement 1 including the pen tip 3, the ink tank 21 that directly retains the ink, the ink retention member 4 that includes the pen tip 3 at the front-end portion, is provided on the front side of the ink tank 21, and temporarily retains the overflow ink accompanying an increase in pressure in the ink tank 21, and the ink guiding member 5 that is provided inside the ink retention member 4 and supplies the ink from the ink tank 21 to the pen tip 3, wherein the ink retention member 4 includes the plurality of plate-shaped comb teeth 41 formed at intervals on the outer surface, the plurality of ink retention grooves 43 that are formed between the comb teeth 41 and temporarily retain the ink, the axially extending slit-shaped ink guiding groove 44 that communicates with the ink tank 21 and communicates with each of the ink retention grooves 43, and the inner hole 45 that is provided to extend in the axial direction and has the ink guiding member 5 provided therein, the ink retention member 4 includes the horizontal hole (the first horizontal hole 46 and/or the second horizontal hole 47) that opens radially outward and communicates with the inner hole 45, the horizontal holes 46 and 47 and the ink guiding groove 44 are formed in non-communicating with each other in the transverse cross-section, and the horizontal holes 46 and 47 includes the inner opening portions 46*a* and 47*a* that open into the inner hole 45, the outer opening portions 46*b* and 47*b* that open radially outward, and the step portions 46*c* and 47*c* that are disposed between the inner opening portions 46*a* and 47*a* and the outer opening portions 46*b* and 47*b* and face radially outward.

Thus, in the writing implement 1 of the present embodiment, the ink discharged from the inner hole 45 to the outside through the horizontal holes 46 and 47 can be prevented from returning to the inside of the inner hole 45 due to the step portions 46*c* and 47*c*. According to the present embodiment, it is possible to prevent problems such as ink leaking from the pen tip 3 due to the overflow ink unintentionally returning from the horizontal holes 46 and 47 to the inner hole 45.

Here, in known writing implements, there is also room for improvement in terms of efficiently returning overflow ink to an ink tank (hereinafter referred to as another problem). In this regard, according to the writing implement 1 of the present embodiment, the overflow ink discharged to the outside from the horizontal holes 46 and 47 can be efficiently returned to the ink tank 21. Accordingly, it is possible to solve the other problem as well.

Figure 15:
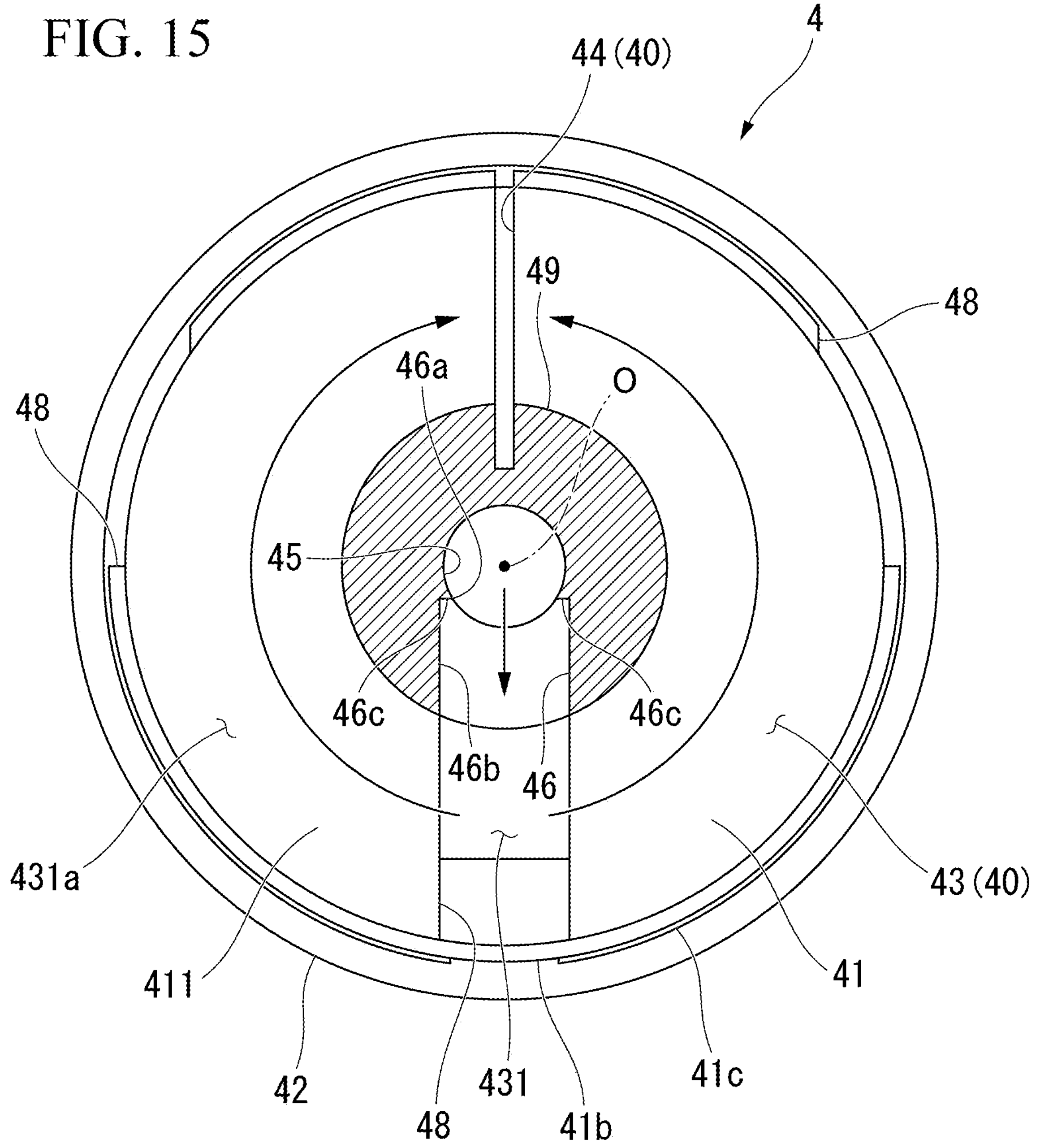
FIG. 15 is a cross-sectional view showing an ink retention member of a writing implement according to a first modified example of the present embodiment, and specifically shows a transverse cross-sectional view corresponding to FIG. 13.
Figure 16:
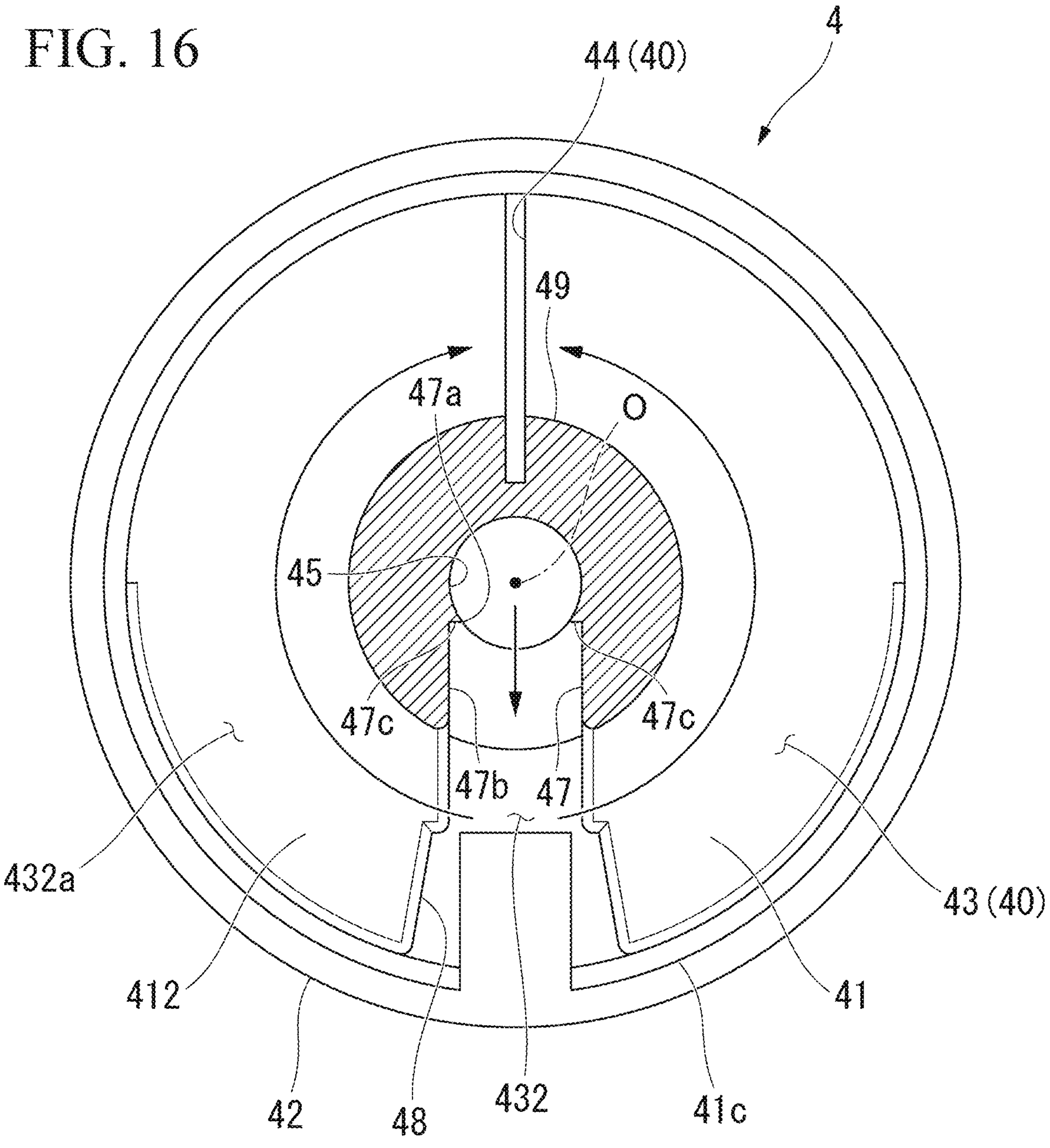
FIG. 16 is a cross-sectional view showing the ink retention member of the writing implement according to the first modified example of the present embodiment, and specifically shows a transverse cross-sectional view corresponding to FIG. 14.

Next, with reference to FIG. 15 and FIG. 16, a writing implement 1 according to a first modified example of the present embodiment will be described. FIG. 15 is a cross-sectional view showing the ink retention member 4 of the writing implement 1 of the first modified example, and specifically, shows a transverse cross-sectional view corresponding to FIG. 13. In addition, FIG. 16 is a cross-sectional view showing the ink retention member 4 of the writing implement 1 of the first modified example, and specifically, shows a transverse cross-sectional view corresponding to FIG. 14. Also, in illustrations of each modified example described below, the same configurations as in the above-described embodiment will be denoted by the same reference numerals, and main differences will be explained below.

In the first modified example, as shown in FIG. 15, the radially inner end portion of the first step portion 46*c* of the first horizontal hole 46 is connected to the inner circumferential surface of the inner hole 45. For this reason, the first inner opening portion 46*a* is located at a ridgeline portion to which the inner circumferential surface of the inner hole 45 and the first step portion 46*c* are connected. In addition, as shown in FIG. 16, the radially inner end portion of the second step portion 47*c* of the second horizontal hole 47 is connected to the inner circumferential surface of the inner hole 45. For this reason, the second inner opening portion 47*a* is located at a ridgeline portion to which the inner circumferential surface of the inner hole 45 and the second step portion 47*c* are connected.

Also in the first modified example, the same effects as in the above-described embodiment can be obtained. Further, in the first modified example, the shape of the mold for molding the ink retention member 4 can be simplified.

Figure 17A:
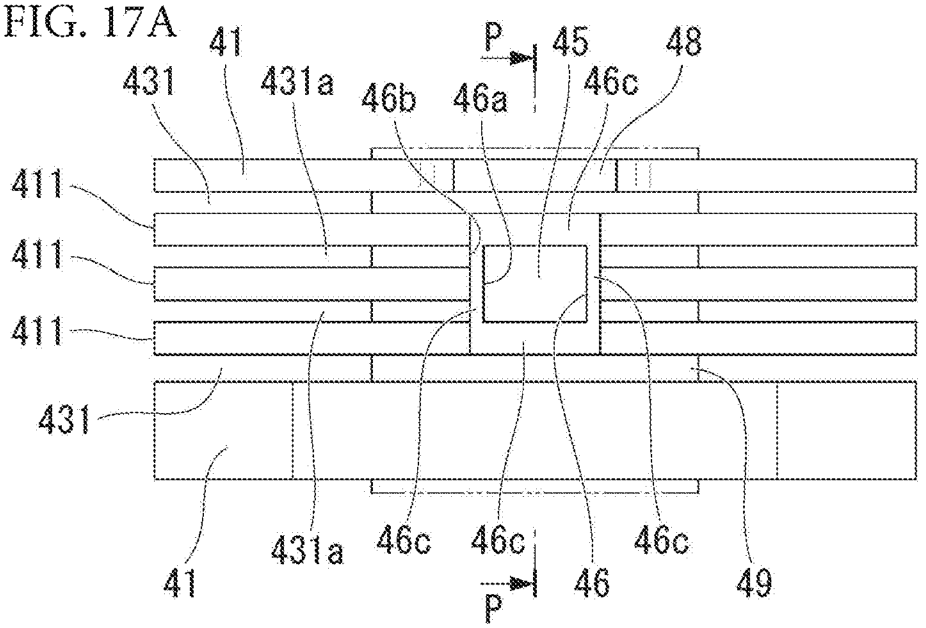
FIG. 17A is a side view showing a portion of an ink retention member of a writing implement according to a second modified example of the present embodiment, and specifically shows a side view corresponding to FIG. 11A
Figure 17B:
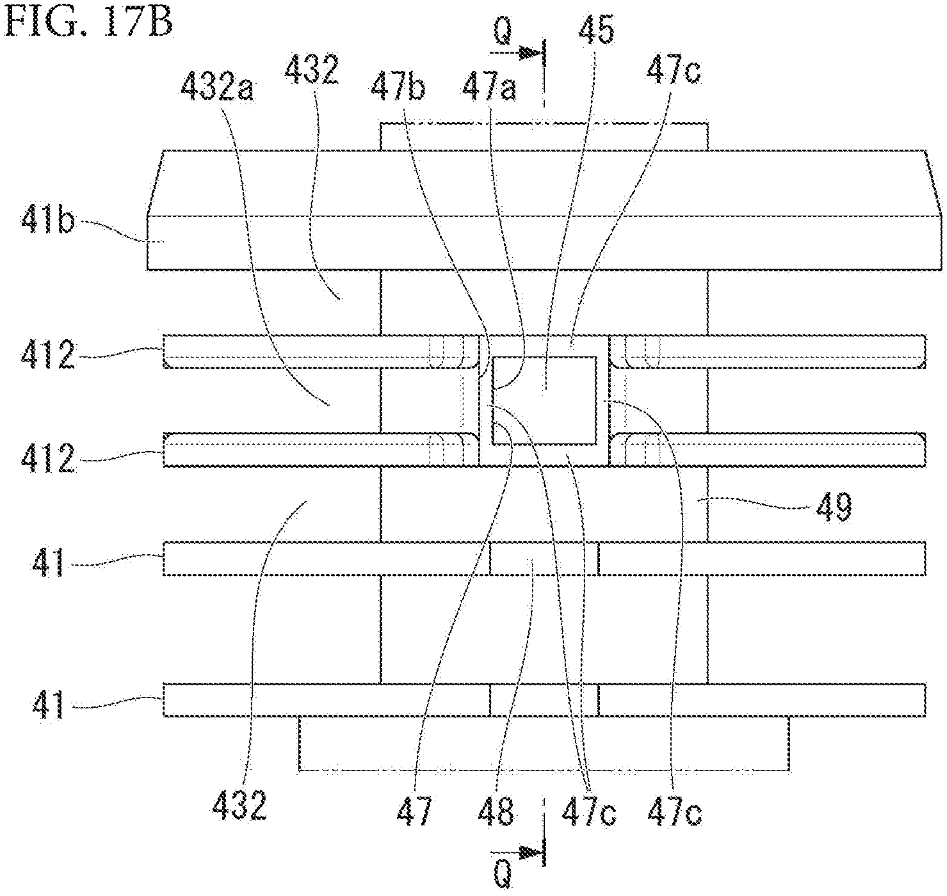
FIG. 17B is a side view showing another part of the ink retention member of the writing implement according to the second modified example of the present embodiment, and specifically shows a side view corresponding to FIG. 11B.
Figure 18A:
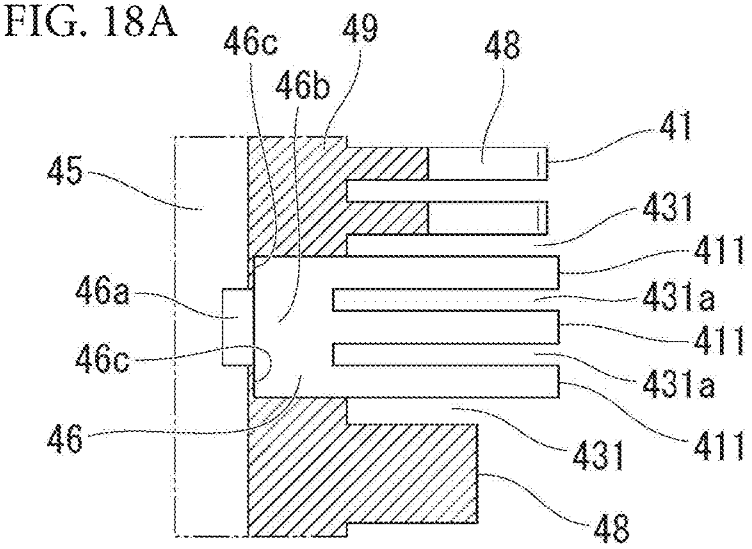
FIG. 18A is a cross-sectional view showing a portion of the ink retention member of the writing implement according to the second modified example of the present embodiment, and specifically shows a vertical cross-sectional view corresponding to FIG. 9A.
Figure 18B:
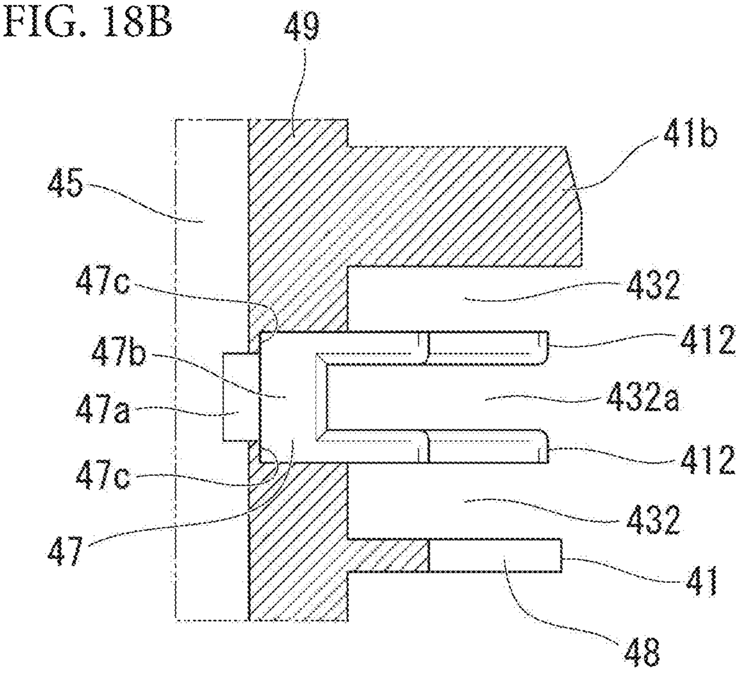
FIG. 18B is a cross-sectional view showing another part of the ink retention member of the writing implement according to the second modified example of the present embodiment, and specifically shows a vertical cross-sectional view corresponding to FIG. 9B

Next, with reference to FIGS. 17A-FIG. 17B and FIG. 18A-FIG. 18B, a writing implement 1 according to a second modified example of the present embodiment will be described. FIG. 17A is a side view showing a portion of the ink retention member 4 of the writing implement 1 of the second modified example, and specifically, shows a side view corresponding to FIG. 11A. FIG. 17B is a side view showing a portion of the ink retention member 4 of the writing implement 1 of the second modified example, and specifically, shows a side view corresponding to FIG. 11B. In addition, FIG. 18A is a cross-sectional view showing a portion of the ink retention member 4 of the writing implement 1 of the second modified example, and specifically, shows a vertical cross-sectional view corresponding to FIG. 9A. FIG. 18B is a cross-sectional view showing a portion of the ink retention member 4 of the writing implement 1 of the second modified example, and specifically, shows a vertical cross-sectional view corresponding to FIG. 9B.

In the second modified example, as shown in FIG. 17A and FIG. 18A, a total of four first step portions 46*c* of the first horizontal hole 46 are provided on the inner wall of the first horizontal hole 46, one pair at both end portions in the width direction (circumferential direction) and one pair at both end portions in the axial direction (front to rear direction). The four first step portions 46*c* are disposed on all four sides of the first horizontal hole 46, which form a rectangular opening shape. Moreover, as shown in FIG. 17B and FIG. 18B, a total of four second step portions 47*c* of the second horizontal hole 47 are provided on the inner wall of the second horizontal hole 47, one pair at both end portions in the width direction (circumferential direction) and one pair at both end portions in the axial direction (front to rear direction). The four second step portions 47*c* are disposed on all four sides of the second horizontal hole 47, which form a rectangular opening shape.

Also in the second modified example, the same effects as in the above-described embodiment can be obtained. Further, in the second modified example, the overflow ink discharged from the inner hole 45 to the outside (ink retention portion 40) through the horizontal holes 46 and 47 can be more stably inhibited from flowing back into the inner hole 45.

The present invention may include combinations of the configurations described in the above-described embodiment and modified examples, and additions, omissions, substitutions, and other changes of the configurations may be made without departing from the spirit of the present invention. Further, the present invention is not limited by the embodiment and the like described above and is limited only by the scope of the claims.

INDUSTRIAL APPLICABILITY

According to the writing implement of the present invention, even if the ink inside freezes, ink leakage from the pen tip can be reliably prevented. Accordingly, it has industrial applicability.

REFERENCE SIGNS LIST

1 Writing implements
2 Shaft cylinder
21 Ink tank
3 Pen tip
31 Ballpoint pen tip
31*a* First relay core
32 Chip holder
32*a* Second relay core
4 Ink retention member
40 Ink retention portion
41 Comb tooth
411 Comb tooth
412 Comb tooth
41*a* Rear end flange portion
41*b* Middle flange portion
41*c* Front-end flange portion
42 Pen tip holding portion
43 Ink retention groove
431 Ink retention groove
431*a* Ink retention groove
432 Ink retention groove
432*a* Ink retention groove
43*a* Shallow groove region
44 Ink guiding groove
45 Inner hole
46 First horizontal hole (horizontal hole)
46*a* First inner opening portion (inner opening portion)
46*b* First outer opening portion (outer opening portion)
46*c* First step portion (step portion)
47 Second horizontal hole (horizontal hole)
47*a* Second inner opening portion (inner opening portion)
47*b* Second outer opening portion (outer opening portion)
47*c* Second step portion (step portion)
48 Air exchange groove
49 Cylinder portion
5 Ink guiding member
O Central axis

What is claimed is:

1. A writing implement comprising:
a pen tip;
an ink tank that directly retains ink;
an ink retention member that includes the pen tip at a front-end portion thereof, is provided on a front side of the ink tank, and temporarily retains overflow ink accompanying an increase in pressure inside the ink tank; and
an ink guiding member that is provided inside the ink retention member and supplies the ink from the ink tank to the pen tip,
wherein the ink retention member includes:
a plurality of plate-shaped comb teeth formed at intervals on an outer surface thereof;
a plurality of ink retention grooves that are formed between the comb teeth and temporarily retain the ink;
an axially extending slit-shaped ink guiding groove that communicates with the ink tank and communicates with each of the ink retention grooves;
an ink retention portion that is formed on an outer surface thereof in a front to rear direction and includes the ink retention grooves and the ink guiding groove; and
an inner hole that is provided to extend in an axial direction and has the ink guiding member provided therein,
the ink retention member includes a first horizontal hole that opens radially outward and communicates with the inner hole,
the first horizontal hole and the ink guiding groove are formed not to communicate with each other in a transverse cross-section, and the first horizontal hole is provided in a rear half portion of the ink retention portion, wherein the first horizontal hole is provided to penetrate at least one comb tooth of the comb teeth in the axial direction and communicates with the ink retention grooves adjacent to the comb tooth, wherein the first horizontal hole includes:

a first inner opening portion that opens into the inner hole;

a first outer opening portion that opens radially outward and communicates with the first inner opening portion; and a first step portion that is disposed between the first inner opening portion and the first outer opening portion and faces radially outward, wherein a dimension in a width direction of the first outer opening portion is greater than a dimension in a width direction of the first inner opening portion.

2. The writing implement according to claim 1, wherein the ink retention member includes a second horizontal hole that is disposed forward from the first horizontal hole, opens radially outward, and communicates with the inner hole, and the second horizontal hole and the ink guiding groove are formed not to communicate with each other in the transverse cross-section.

3. The writing implement according to claim 2, wherein the second horizontal hole is provided to penetrate at least one comb tooth of the comb teeth in the axial direction and communicates with the ink retention grooves adjacent to the comb tooth.

4. The writing implement according to claim 2, wherein the second horizontal hole includes;

a second inner opening portion that opens into the inner hole;

a second outer opening portion that opens radially outward; and a second step portion that is disposed between the second inner opening portion and the second outer opening portion and faces radially outward.

5. A writing implement comprising:

a pen tip;

an ink tank that directly retains ink;

an ink retention member that includes the pen tip at a front-end portion thereof, is provided on a front side of the ink tank, and temporarily retains overflow ink accompanying an increase in pressure inside the ink tank; and an ink guiding member that is provided inside the ink retention member and supplies the ink from the ink tank to the pen tip, wherein the ink retention member includes:

a plurality of plate-shaped comb teeth formed at intervals on an outer surface thereof;

a plurality of ink retention grooves that are formed between the comb teeth and temporarily retain the ink;

an axially extending slit-shaped ink guiding groove that communicates with the ink tank and communicates with each of the ink retention grooves; and an inner hole that is provided to extend in an axial direction and has the ink guiding member provided therein, the ink retention member includes a horizontal hole that opens radially outward and communicates with the inner hole, the horizontal hole and the ink guiding groove are formed not to communicate with each other in a transverse cross-section, the horizontal hole is provided to penetrate at least one comb tooth of the comb teeth in the axial direction and communicates with the ink retention grooves adjacent to the comb tooth, wherein the horizontal hole includes:

an inner opening portion that opens into the inner hole;

an outer opening portion that opens radially outward and communicates with the inner opening portion; and a step portion that is disposed between the inner opening portion and the outer opening portion and faces radially outward, wherein a dimension in a width direction of the outer opening portion is greater than a dimension in a width direction of the inner opening portion.

6. A writing implement comprising:

a pen tip;

an ink tank that directly retains ink;

an ink retention member that includes the pen tip at a front-end portion thereof, is provided on a front side of the ink tank, and temporarily retains overflow ink accompanying an increase in pressure inside the ink tank; and an ink guiding member that is provided inside the ink retention member and supplies the ink from the ink tank to the pen tip, wherein the ink retention member includes:

a plurality of plate-shaped comb teeth formed at intervals on an outer surface thereof, a plurality of ink retention grooves that are formed between the comb teeth and temporarily retain the ink;

an axially extending slit-shaped ink guiding groove that communicates with the ink tank and communicates with each of the ink retention grooves; and an inner hole that is provided to extend in an axial direction and has the ink guiding member provided therein, the ink retention member includes a horizontal hole that opens radially outward and communicates with the inner hole, the horizontal hole and the ink guiding groove are formed not to communicate with each other in a transverse cross-section, and the horizontal hole includes:

an inner opening portion that opens into the inner hole;

an outer opening portion that opens radially outward and communicates with the inner opening portion; and a step portion that is disposed between the inner opening portion and the outer opening portion and faces radially outward, wherein a dimension in a width direction of the outer opening portion is greater than a dimension in a width direction of the inner opening portion.

* * * * *